US011310717B2

(12) United States Patent
Lin et al.

(10) Patent No.: US 11,310,717 B2
(45) Date of Patent: Apr. 19, 2022

(54) RELAY NODE SELECTION METHOD AND DEVICE

(71) Applicant: CHINA ACADEMY OF TELECOMMUNICATIONS TECHNOLOGY, Beijing (CN)

(72) Inventors: Lin Lin, Beijing (CN); Ying Peng, Beijing (CN); Rui Zhao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 25 days.

(21) Appl. No.: 16/968,456

(22) PCT Filed: Jan. 22, 2019

(86) PCT No.: PCT/CN2019/072705
§ 371 (c)(1),
(2) Date: Aug. 7, 2020

(87) PCT Pub. No.: WO2019/154074
PCT Pub. Date: Aug. 15, 2019

(65) Prior Publication Data
US 2020/0404571 A1 Dec. 24, 2020

(30) Foreign Application Priority Data
Feb. 9, 2018 (CN) .......................... 201810136950.5

(51) Int. Cl.
*H04W 40/22* (2009.01)
*H04W 40/12* (2009.01)

(52) U.S. Cl.
CPC .......... *H04W 40/22* (2013.01); *H04W 40/12* (2013.01)

(58) Field of Classification Search
None
See application file for complete search history.

(56) References Cited

U.S. PATENT DOCUMENTS 8,000,657 B2 *  8/2011  Do ................... H04W 40/22
                                        455/67.13
2002/0187746 A1 * 12/2002  Cheng ............... H04W 74/08
                                        455/11.1
(Continued)

FOREIGN PATENT DOCUMENTS

CN    101039526 A    9/2007
CN    102595558 A    7/2012
(Continued)

OTHER PUBLICATIONS

International Search Report and Written Opinion issued by the International Searching Authority (ISA/CN in PCT Application No. PCT/CN2019/072705 dated Apr. 4, 2019. 8 pages, including English translation of International Search Report.

*Primary Examiner* — Brian S Roberts
(74) *Attorney, Agent, or Firm* — Meunier Carlin & Curfman LLC

(57) ABSTRACT

Disclosed in the present application are a relay node selection method and device, which are used to solve the problem of no relay node selection method being available currently for communication modes such as UE-to-Network Relay or UE-to-UE Relay. According to the embodiments of the present application, a first device receives a report message sent by at least one relay node; and the first device selects a target relay node from among the at least one relay node so that a remote terminal establishes a connection with a target node by means of the target relay node.

10 Claims, 5 Drawing Sheets

(56) References Cited

U.S. PATENT DOCUMENTS

| | | | | |
|---|---|---|---|---|
| 2007/0165581 | A1* | 7/2007 | Mehta | H04B 7/026 |
| | | | | 370/338 |
| 2013/0188542 | A1* | 7/2013 | Merlin | H04W 40/12 |
| | | | | 370/311 |
| 2017/0347338 | A1 | 11/2017 | Chen et al. | |
| 2018/0041605 | A1 | 2/2018 | Zhang et al. | |
| 2019/0379450 | A1* | 12/2019 | Kamei | H04B 7/15542 |
| 2020/0008127 | A1* | 1/2020 | Ohtsuji | H04W 40/22 |

FOREIGN PATENT DOCUMENTS

| | | |
|---|---|---|
| CN | 104936267 A | 9/2015 |
| CN | 105430633 A | 3/2016 |
| CN | 105657643 A | 6/2016 |
| CN | 105992298 A | 10/2016 |
| CN | 106211025 A | 12/2016 |
| CN | 106211026 A | 12/2016 |
| CN | 106454993 A | 2/2017 |
| CN | 106714248 A | 5/2017 |
| CN | 106937384 A | 7/2017 |
| CN | 107135526 A | 9/2017 |
| EP | 1545076 A2 | 6/2005 |
| EP | 3226583 A1 | 4/2017 |
| EP | 3273745 A1 | 1/2018 |
| WO | 2005107207 A1 | 11/2005 |
| WO | 2010142852 A1 | 12/2010 |
| WO | 2016162852 A1 | 10/2016 |

* cited by examiner

RELAY NODE SELECTION METHOD AND DEVICE

CROSS-REFERENCE TO RELATED APPLICATIONS

The present application is a National Stage of International Application No. PCT/CN2019/072705, filed Jan. 22, 2019, claims benefit of priority to Chinese Application No. 201810136950.5 filed with the Chinese Patent Office on Feb. 9, 2018, and titled "RELAY NODE SELECTION METHOD AND DEVICE", the entire contents of which incorporated herein by reference.

FIELD

The present application relates to the technical field of wireless communication, and in particular to a method and device for selecting a relay node.

BACKGROUND

In a long term evolution (LTE) system, a centralized control mode of a network is adopted for communication. That is, uplink and downlink data of a user equipment (UE) are transmitted and received under control of the network. As shown in FIG. 1A, communication between UEs is forwarded and controlled by the network, and there is no direct communication link between the UEs. In this way, data transmission between the UE and the network can be referred to as device to network (D2N) transmission.

In addition, device to device (D2D), i.e., a terminal pass-through technology, refers to a way that neighboring terminals can transmit data through a direct link in a close range, without forwarding via a central node (i.e., a base station) or transmitting information between UEs via a traditional cellular link.

In a 3rd generation partnership project (3GPP D2D proximity service includes the following two categories.

D2D Discovery: a UE uses evolved-UMTS terrestrial radio access (E-UTRA) to confirm that another UE is nearby. For example, D2D UEs can use this service to find nearby taxis, find nearby friends, etc.

D2D Communication: for UEs that are close to each other, a link is directly established between two UEs, as shown in FIG. 1B, so that a communication link originally transmitted through a network is converted into a local direct communication link, saving a lot of bandwidth and improving network efficiency; or two UEs that are close to each other can use direct link communication to obtain stable, high-speed and low-cost communication services. Proximity service communication is generally performed under the control or assistance of a network, and a base station may even dynamically allocate resources for a UE performing proximity service communication.

Based on the D2D discovery and communication technology, a UE can perform D2D discovery or data transmission with a network or other UEs by means of a relay node. There are two modes of relay nodes.

UE-to-Network Relay.

The way that a UE communicates with a network through a Relay UE is called UE-to-Network Relay, as shown in FIG. 1C. In order to communicate with the network, UE2 outside the network coverage uses UE1 as a relay node to forward uplink and downlink signals thereof through UE1. The communication between UE1 and UE2 is realized through D2D communication, and the communication between UE1 and the network is realized through cellular communication.

UE-to-UE Relay.

The way that a UE performs discovery/communication with a target UE through a Relay UE is called UE-to-UE Relay, as shown in FIG. 1D. In order to communicate with UE4 that is not within UE2's own direct communication range, UE2 can forward its own information through UE1. Data transmission between UE1 and UE2, and data transmission between UE1 and UE4 are achieved through D2D communication.

When using communication modes such as UE-to-Network Relay or UE-to-UE Relay, a UE needs to perform D2D discovery or data transmission with a network or other UEs via a relay node. In order to ensure reliability of data transmission, a suitable relay node needs to be selected for the UE. However, at present, there is no method for selecting a relay node for the UE-to-Network Relay or UE-to-UE Relay communication.

SUMMARY

Disclosed in the present application are a method and device for selecting a relay node, which are used to solve the problem of no method for selecting a relay node being available currently for communication modes such as UE-to-Network Relay or UE-to-UE Relay.

On the basis of the above problem, in a first aspect, an embodiment of the present application provides a method for selecting a relay node.

The method includes: receiving, by a first device, a report message transmitted by at least one relay node; and selecting, by the first device, a target relay node from the at least one relay node, to enable a remote terminal to establish a connection with a target node via the target relay node.

In a second aspect, an embodiment of the present application provides a first device for selecting a relay node. The first device includes a processor, a memory, and a transceiver.

The processor is configured for reading one or more programs in the memory and executing: receiving a report message transmitted by at least one relay node via the transceiver; and selecting a target relay node from the at least one relay node to enable a remote terminal to establish a connection with a target node via the target relay node.

In a third aspect, an embodiment of the present application provides a first device for selecting a relay node. The first device includes: a reception module for receiving a report message transmitted by at least one relay node; and a selection module for selecting a target relay node from the at least one relay node to enable a remote terminal to establish a connection with a target node by means of the target relay node.

In a fourth aspect, an embodiment of the present application provides a computer-storable medium, with one or more computer programs stored thereon, where the one or more computer programs, when executed by the processor, implement steps of the method performed by the first device.

In the method for selecting a relay node provided by an embodiment of the present application, a first device receives a report message transmitted by at least one relay node, and selects a target relay node from the at least one relay node so that a remote terminal establishes a connection with a target node via the target relay node. According to the embodiments of the present application, a suitable target relay node is selected from the relay nodes that send a report message so that the remote terminal establishes a communication connection with the target node via the target relay node, and transmits data, thereby ensuring reliability of data transmission, and further improving system performance.

DETAILED DESCRIPTION OF THE EMBODIMENTS

To make the objects, technical solutions and advantages of the present application more apparent, the present application will be described in further detail in conjunction with the accompanying drawings. Obviously, the described embodiments are only a part of embodiments of the present application, but not all the embodiments. On the basis of the embodiments in the present application, all other embodiments obtained by those of ordinary skill in the art without inventive efforts fall within the scope of the present application.

Figure 1A:
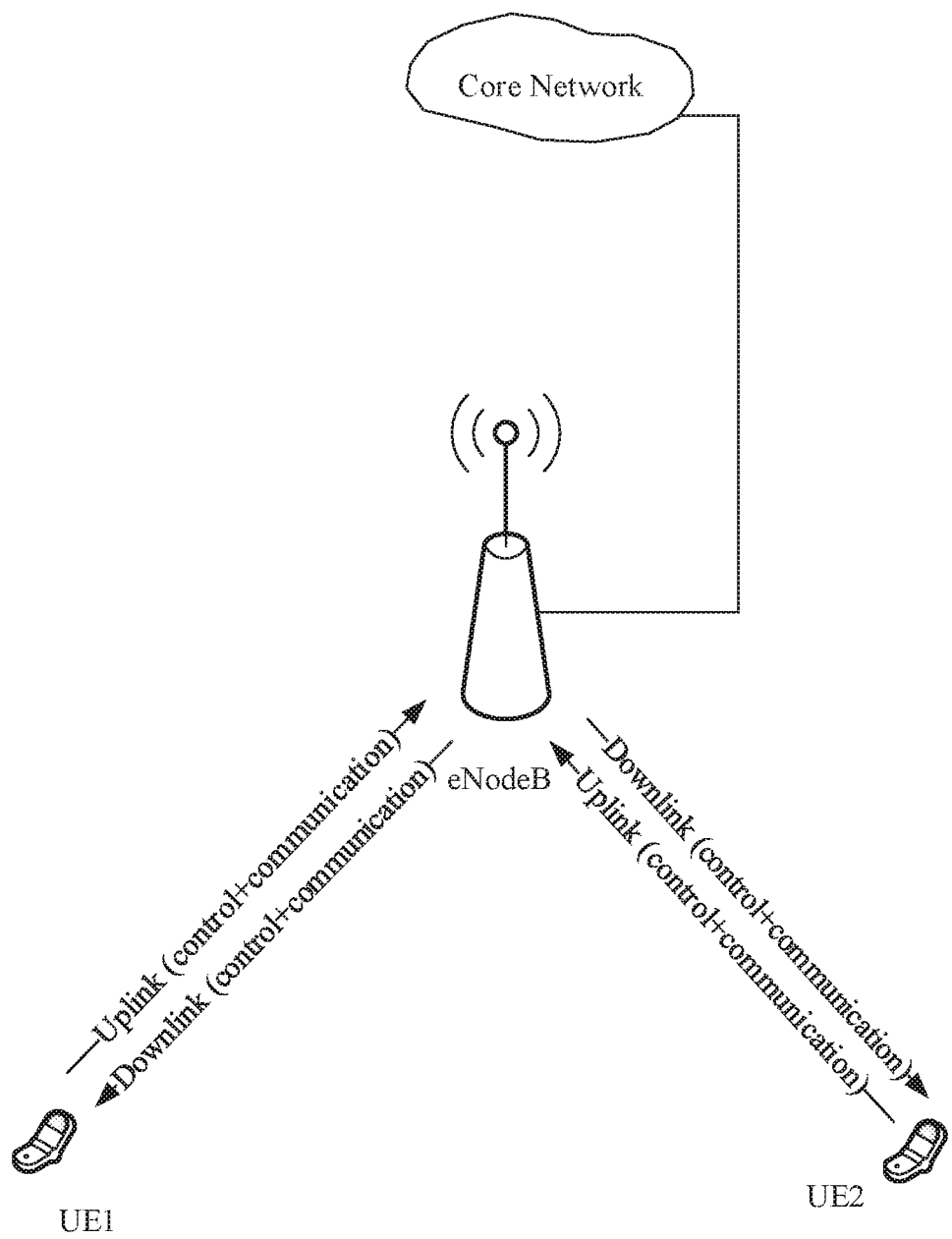
FIGS. 1A to 1D are schematic diagrams of communication modes in the related art.
Figure 1B:
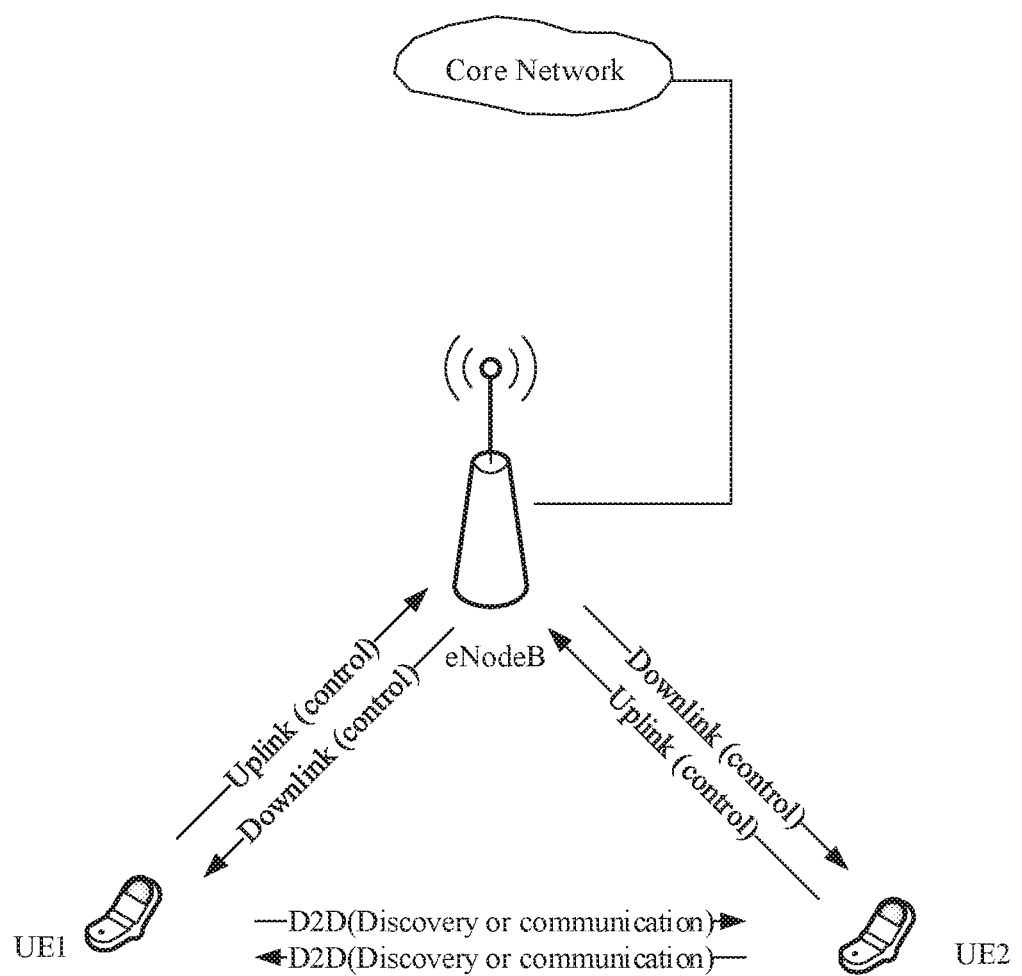
Figure 1C:
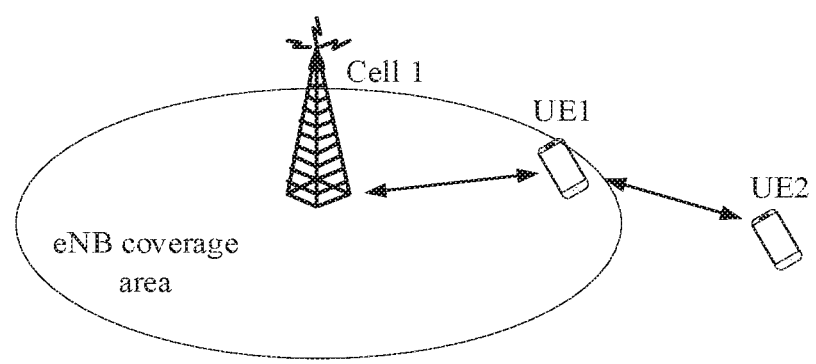
Figure 1D:
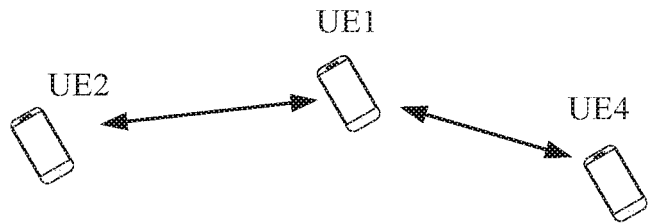
Figure 2:
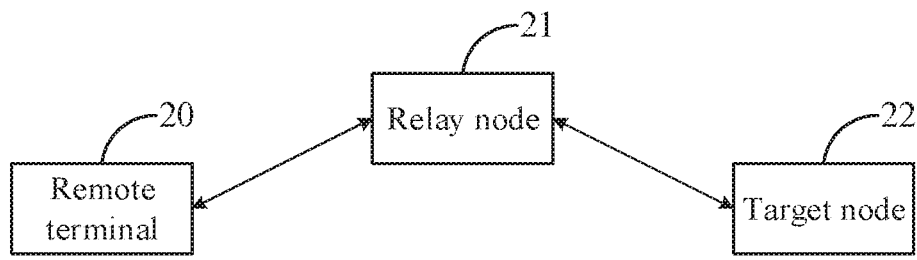
FIG. 2 is a schematic diagram of a system architecture according to an embodiment of the present application.

The method for selecting a relay node in the embodiments of the present application can be applied to communication modes such as UE-to-Network Relay or UE-to-UE Relay. The system architecture as shown in FIG. 2 includes a remote terminal 20, a relay node 21, and a target node 22. The remote terminal 20 establishes a communication connection with the target node 22 via the target relay node 21. The target node 22 may be a UE or a network device.

Figure 3:
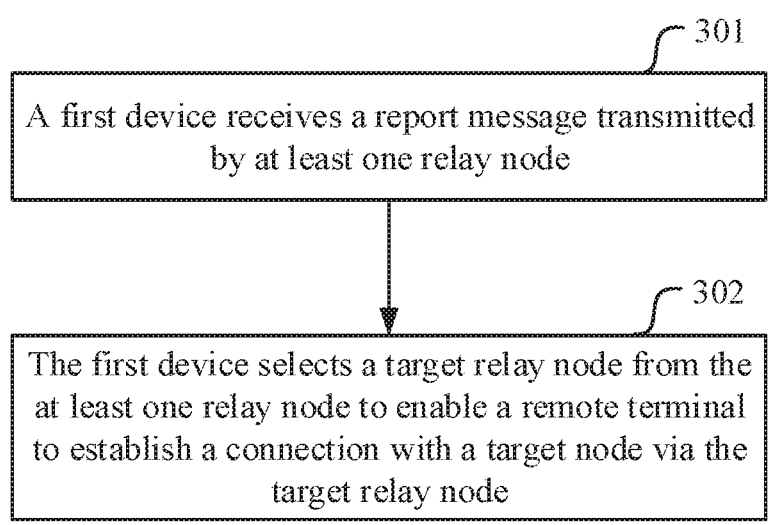
FIG. 3 is a flow chart of a method for selecting a relay node according to an embodiment of the present application.

On the basis of the above system architecture, as shown in FIG. 3, a method for selecting a relay node in an embodiment of the present application includes the following steps.

Step 301, a first device receives a report message transmitted by at least one relay node.

Step 302, the first device selects a target relay node from the at least one relay node to enable a remote terminal to establish a connection with a target node via the target relay node.

In embodiments of the present application, the first device may select a target relay node by using the following two modes.

Mode one, the first device randomly selects a target relay node.

Optionally, the first device randomly selects a target relay node from at least one relay node that receives a report message.

In the mode one, the report message is actively transmitted by the at least one relay node to the first device; or the report message is a message for feedback returned to the first device after the at least one relay node receives a relay request message transmitted by the first device.

The first device may be any one of a remote terminal, a network-side device and a third-party device.

It should be noted that the third-party device is another network device or terminal except the remote terminal, the relay node, and the target node in the above network architecture.

When the first device is a remote terminal, the remote terminal receives a report message of a relay node in any one of the following ways.

1. The remote terminal receives a report message actively transmitted by the relay node.

Specifically, the relay node directly transmits the report message to the remote terminal.

The relay node may transmit the report message in the form of broadcast, multicast or unicast.

Alternatively, the relay node transmits the report message to a network-side device or a third-party device; and the network-side device or the third-party device transmits the report message to the remote terminal.

The relay node directly transmits the report message to the network-side device or the third-party device; and the network-side device or the third-party device transmits the report message in the form of broadcast, multicast, or unicast.

2. The remote terminal sends a relay request message to a relay node, and the remote terminal receives a report message returned by the relay node.

Specifically, the remote terminal sends the relay request message in the form of broadcast, multicast, or unicast; and the relay node returns the report message to the remote terminal after receiving the relay request message.

Alternatively, the remote terminal sends the relay request message to a network-side device or a third-party device; the network-side device or the third-party device sends the relay request message in the form of broadcast, multicast, or unicast; and the relay node returns the report message to the remote terminal after receiving the relay request message.

The method for selecting a relay node using mode one is described below in an embodiment of the present application, where the remote terminal sends a relay request message to the relay node, and the remote terminal receives the report message returned by the relay node.

Figure 4:
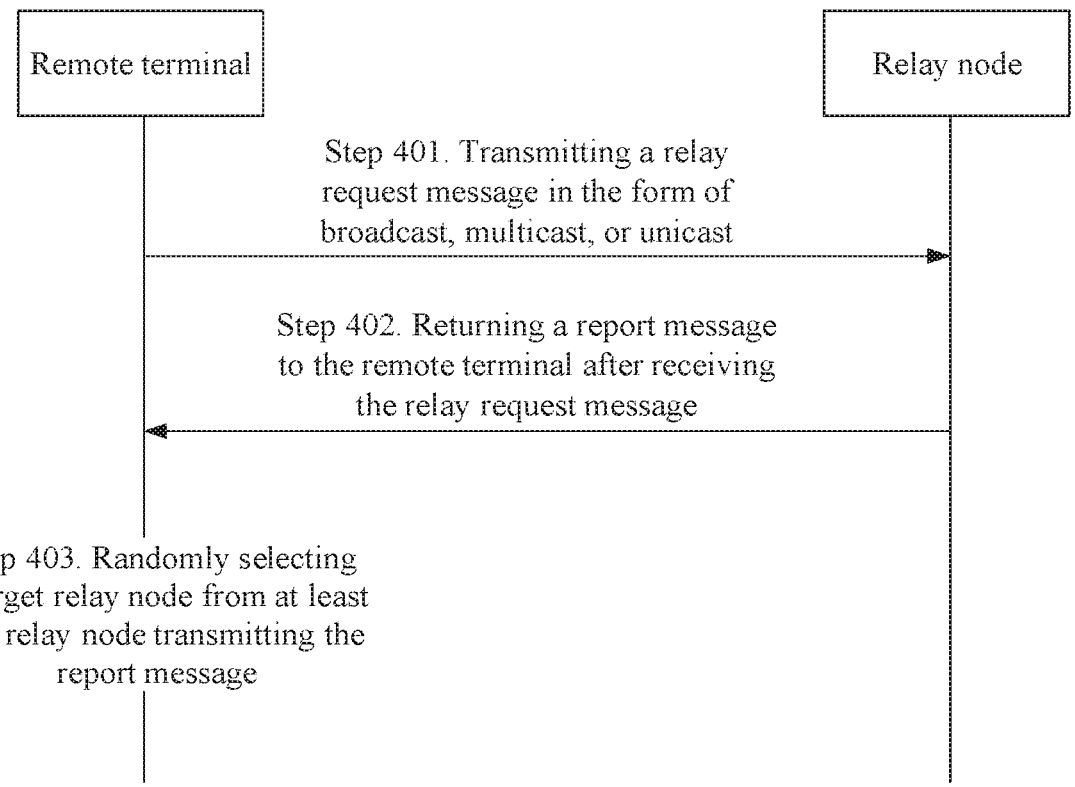
FIG. 4 is a flow chart of selecting a relay node by using mode one according to an embodiment of the present application.

FIG. 4 shows a flow chart in which selecting a relay node by using mode one according to an embodiment of the present application.

Step 401, a remote terminal sends a relay request message in the form of broadcast, multicast, or unicast.

Step 402, a relay node returns a report message to the remote terminal after receiving the relay request message.

Step 403, the remote terminal randomly selects a target relay node from at least one relay node that sends the report message.

When the first device is a network-side device or a third-party device, the network-side device or the third-party device receives the report message of the relay node in the following way.

After receiving a relay request message transmitted by the remote terminal, the network-side device or the third-party device receives the report message transmitted by the at least one relay node; and the network-side device or the third-party device randomly selects a target relay node from the at least one relay node that sends the report message.

Mode two: the first device selects a target relay node according to channel measurement information detected by a remote terminal for each relay node.

Optionally, the first device selects a target relay node from the at least one relay node according to channel measurement information detected by a specific device for each relay node.

The specific device is any one of the first device, the remote terminal, the target node, other terminals with measurement capability, or a network-side device.

It should be noted that, when the specific device is not the first device, the specific device needs to report the measured channel measurement information of each relay node to the first device.

In mode two, the report message is actively transmitted by the relay node to the first device; or the report message is a message for feedback returned to the first device after the relay node receives a relay request message transmitted by the first device.

The first device may be any of a remote terminal, a network-side device and a third-party device.

It should be noted that the third-party device is another network device or terminal except the remote terminal, the relay node, and the target node in the above network architecture.

In implementation, the methods for transmitting the report message by the relay node in the mode one and the mode two are the same. For details, reference may be made to the method for transmitting the report message by the relay node in the mode one, which is not described in detail herein.

After receiving the report message from the at least one relay node, the first device determines the channel measurement information for each relay node, and selects a target relay node from the at least one relay node according to the channel measurement information detected by the specific device for each relay node.

Specifically, the channel measurement information includes but is not limited to: received signal strength indication (RSSI), reference signal receiving power (RSRP), reference signal receiving quality (RSRQ) and an interference measurement value obtained by the first device by measuring the relay node.

Optionally, the first device uses a relay node that satisfies the following conditions as a target relay node: channel measurement information measured by the specific device with the relay node satisfies at least one of the following conditions: first, the channel measurement information being not worse than one or more preset thresholds; and second, part or all of the channel measurement information being one of top M in an order of part or all of channel measurement information of all relay nodes from good to poor.

The following description will be made for different pieces of channel measurement information, respectively.

1. RSSI.

Regarding the first condition above, one or more thresholds are preset, and when RSSI measured by the specific device with a relay node is not less than the one or more thresholds, it indicates that RSSI is not worse than the one or more preset thresholds, then the relay node satisfies the first condition above.

Regarding the second condition above, RSSI measured by the specific device with each relay node is determined, and relay nodes are sorted according to corresponding RSSI sizes from high to low, then top M relay nodes satisfy the second condition above.

2. RSRP.

Regarding the first condition above, one or more thresholds are preset, and when RSRP measured by the specific device with a relay node is not less than the one or more thresholds, it indicates that RSRP is not worse than the one or more preset thresholds, then the relay node satisfies the first condition above.

Regarding the second condition above, RSRP measured by the specific device with each relay node is determined, and relay nodes are sorted according to corresponding RSRP sizes from high to low, then top M relay nodes satisfy the second condition above.

3. RSRQ.

Regarding the first condition above, one or more thresholds are preset, and when RSRQ measured by the specific device with a relay node is not less than the one or more thresholds, it indicates that RSRQ is not worse than the one or more preset thresholds, then the relay node satisfies the first condition above.

Regarding the second condition above, RSRQ measured by the specific device with each relay node is determined, and relay nodes are sorted according to corresponding RSRQ sizes from high to low, then top M relay nodes satisfy the second condition above.

4. Interference measurement value.

Regarding the first condition above, one or more thresholds are preset, and when an interference measurement value measured by the specific device with a relay node is not greater than the one or more thresholds, it indicates that the interference measurement value is not worse than the one or more preset thresholds, then the relay node satisfies the first condition above.

Regarding the second condition above, the interference measurement value measured by the specific device with each relay node is determined, and relay nodes are sorted according to corresponding interference measurement values from low to high, then top M relay nodes satisfy the second condition above.

It should be noted that the method for selecting a target relay node according to RSSI, RSRP, RSRQ, and an interference measurement value is only an example for selecting a target relay node according to channel measurement information detected by a specific device for each relay node in an embodiment of the present application. Any other information associated with the channel measurement information falls within the scope of the embodiments of the present application.

Mode three: the first device selects a target relay node according to relay condition information of a relay node.

Optionally, the first device selects a target relay node from the at least one relay node according to the relay condition information transmitted by each relay node, and/or channel measurement information detected by a remote terminal for each relay node.

The first device in the embodiments of the present application may be a remote terminal, or the first device may be an independent network-side device or a third-party device.

It should be noted that the third-party device in the embodiments of the present application is another network device or terminal except the remote terminal, the relay node, and the target node in the above network architecture.

The following description will be made for different conditions, respectively.

I. The first device is a remote terminal.

Figure 5:
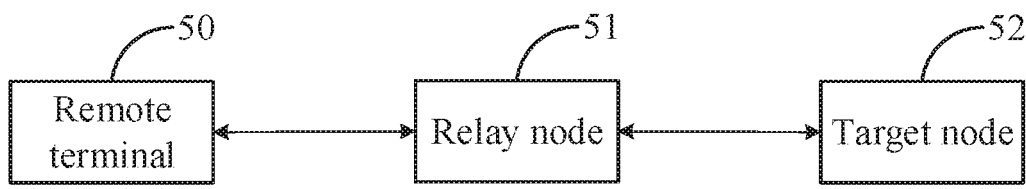
FIG. 5 is a schematic structural diagram of a first relay node selection system according to an embodiment of the present application.

In this condition, as shown in FIG. 5, a system for selecting a relay node in an embodiment of the present application includes a remote terminal 50, at least one relay node 51, and a target node 52.

The remote terminal 50 is configured for receiving relay condition information transmitted by at least one relay node 51; selecting a target relay node from the at least one relay node according to the relay condition information transmitted by each relay node, and/or channel measurement information detected by a specific device for each relay node; and establishing a connection with the target node 52 via the target relay node.

In implementation, a relay node sends relay condition information in the following modes.

Mode 1: The relay node actively reports relay condition information to the remote terminal.

Optionally, the remote terminal receives relay condition information directly transmitted by the at least one relay node; or the remote terminal receives relay condition information transmitted by the at least one relay node through a network-side device or a third-party device.

In mode 1, the relay condition information includes at least one of the following information: information associated with path planning of a relay node, information associated with a vector speed of a relay node, information associated with a service which a relay node contributes, information associated with a service indicator which a relay node contributes, information associated with a service supported by a relay node, information associated with a service indicator supported by a relay node, information associated with transmission power of a relay node, information associated with a sending resource pool used by a relay node, information associated with a transmission mode of a relay node, information associated with a release version of a relay node, and information associated with channel measurement between a relay node and a specific device.

The following detailed description will be made for different pieces of information, respectively.

1. Information associated with path planning of a relay node.

Information associated with path planning of a relay node includes but is not limited to the following information: related description of map elements, grid label arrangement and identification arrangement of roadside devices.

For example, information associated with path planning of a relay node may be a road segment, a distance, a driving time, and so on.

It should be noted that the given information associated with path planning is only an example of information associated with path planning of the relay node in an embodiment of the present application. Any other information associated with the path planning falls within the protection scope of the embodiments of the present application.

2. Information associated with a vector speed of a relay node.

Information associated with a vector speed of a relay node includes but is not limited to: a traveling road segment, a moving direction, a moving speed and an angle of the relay node.

For example, the information associated with a vector speed in the relay condition information transmitted by the relay node is: road segment x, southbound, 80 km/h.

It should be noted that the given information associated with a vector speed is only an example of information associated with a vector speed of the relay node in an embodiment of the present application. Any other information associated with the vector speed falls within the protection scope of the embodiments of the present application.

3. Information associated with a service which a relay node contributes.

Information associated with a service which a relay node contributes may be a service set which the relay node contributes.

For example, the information associated with a service which a relay node contributes in the relay condition information transmitted by the relay node is: a service set which the relay node contributes {cooperative decision service, remote driving service}, a service set which the relay node contributes {service with priority 1, service with priority 3}, a service set which the relay node contributes {service with service id 001, service with service id 007}.

It should be noted that the given service set in participation is only an example of information associated with a service which the relay node contributes in an embodiment of the present application. Any other information associated with the service in participation falls within the protection scope of the embodiments of the present application.

4. Information associated with a service indicator which a relay node contributes.

Information associated with a service which a relay node contributes may be a service indicator set which the relay node contributes.

For example, the information associated with a service indicator which a relay node contributes in the relay condition information transmitted by the relay node is: an indicator set of services which the relay node contributes {delay indicator 20 ms, reliability indicator 99%, coverage indicator 500 m, data rate indicator 5 Mbps, and the number of supported terminals 200}.

It should be noted that the given service indicator set in participation is only an example of information associated with services which the relay node contributes in an embodiment of the present application. Any other information associated with the services in participation falls within the protection scope of the embodiments of the present application.

5. Information associated with a service supported by a relay node.

Information associated with a service supported by a relay node may be a service set supported by the relay node.

For example, the information associated with a service supported by a relay node in the relay condition information transmitted by the relay node is: a service set supported by the relay node {basic road safety service, video forwarding service}, a service set supported by the relay node {service with priority less than 7}, a service set supported by the relay node {service with service id 001, service with service id 007}.

It should be noted that the supported service set given above is only an example of information associated with a service supported by the relay node in an embodiment of the present application. Any other information associated with the supported service falls within the protection scope of the embodiments of the present application.

6. Information associated with a service indicator supported by a relay node.

Information associated with a service in support by a relay node may be an indicator set of services supported by the relay node.

For example, the information associated with a service indicator supported by a relay node in the relay condition information transmitted by the relay node is: a service indicator set supported by the relay node {delay indicator 20 ms, reliability indicator 99%, coverage indicator 500 m, data rate indicator 5 Mbps, and number of supported terminals 200}.

It should be noted that the supported service indicator set given above is only an example of information associated with a service indicator supported by the relay node in an embodiment of the present application. Any other information associated with the supported service indicator falls within the protection scope of the embodiments of the present application.

7. Information associated with transmission power of a relay node.

Information associated with transmission power of a relay node may be an actual transmission power value of the relay node, or a power level, or other indicators that can indicate the transmission power capability.

For example, the information associated with transmission power of a relay node in the relay condition information transmitted by the relay node is 26 dBm, or level 2.

It should be noted that the actual transmission power value and power level of the relay node given above are only examples of information associated with transmission power of the relay node in an embodiment of the present application. Any other information associated with the transmission power falls within the protection scope of the embodiments of the present application.

8. Information associated with a sending resource pool used by a relay node.

Information associated with a sending resource pool used by a relay node may be a sending resource pool used by the relay node.

For example, if the sending resource pool used by the relay node is resource pool x, the information associated with the sending resource pool used by the relay node in the relay condition information transmitted by the relay node is resource pool x.

9. Information associated with a transmission mode of a relay node.

Information associated with a transmission mode of a relay node is a transmission mode currently used by the relay node.

For example, if the transmission mode currently used by the relay node is mode 3, the information associated with the transmission mode of the relay node in the relay condition information transmitted by the relay node is mode 3.

10. Information associated with a release version of a relay node.

Information associated with a release version of a relay node is a release version currently used by the relay node.

For example, if the release version currently used by the relay node is Release 14, the information associated with the release version of the relay node in the relay condition information transmitted by the relay node is Release 14.

11. Information associated with channel measurement between a relay node and a specific device.

Information associated with channel measurement between a relay node and a specific device includes but is not limited to: RSSI, RSRP, RSRQ and an interference measurement value obtained by the relay node by measuring the specific device.

Mode 2: After receiving a relay request message, the relay node sends relay condition information to the remote terminal.

Optionally, before the remote terminal receives the relay condition information transmitted by the at least one relay node, the remote terminal sends the relay request message to the at least one relay node.

The remote terminal sends a relay request message to the at least one relay node in the following way.

1. The remote terminal directly sends a relay request message to the at least one relay node.

Specifically, the remote terminal sends the relay request message to at least one relay node in the form of broadcast, multicast, or unicast.

2. The remote terminal sends a relay request message to the at least one relay node through a network-side device or a third-party device.

The remote terminal sends the relay request message to the network-side device or the third-party device, and the network-side device or the third-party device sends the relay request message to at least one relay node in the form of broadcast, multicast, or unicast.

When the type of the relay request message is different, the way in which the relay node sends the relay condition information to the remote terminal is also different, which will be described in the following cases.

Case 1: The relay request message is configured for causing the relay node to return the relay condition information to the remote terminal after receiving the relay request message.

Specifically, after receiving the relay request message, the relay node sends the relay condition information to the remote terminal according to predetermination.

It should be noted that, in case 1, the relay condition information transmitted by the relay node to the remote terminal is predetermined.

In case 1, the relay condition information transmitted by the relay node to the remote terminal includes at least one of the following information: information associated with path planning of a relay node, information associated with a vector speed of a relay node, information associated with a service which a relay node contributes, information associated with a service indicator which a relay node contributes, information associated with a service supported by a relay node, information associated with a service indicator supported by a relay node, information associated with transmission power of a relay node, information associated with a sending resource pool used by a relay node, information associated with a transmission mode of a relay node, information associated with a release version of a relay node, and information associated with channel measurement between a relay node and a specific device.

It should be noted that, for the content of the above-mentioned information included in the relay condition information, reference can be made to the description in Mode 1, and details are not described herein again.

Case 2: The relay request message is configured for indicating the relay condition information that the relay node requires to report.

Specifically, in case 2, after receiving the relay request message, the relay node reports according to the relay condition information that requires to be reported in the relay request message.

The relay condition information that the remote terminal indicates the relay node to report includes at least one of the following information: information associated with path planning of a relay node, information associated with a vector speed of a relay node, information associated with a service which a relay node contributes, information associated with a service indicator which a relay node contributes, information associated with a service supported by a relay node, information associated with a service indicator supported by a relay node, information associated with transmission power of a relay node, information associated with a sending resource pool used by a relay node, information associated with a transmission mode of a relay node, information associated with a release version of a relay node, and information associated with channel measurement between a relay node and a specific device.

The following detailed description will be made for different pieces of information, respectively.

1. Information associated with path planning of a relay node.

When the relay request message transmitted by the remote terminal requires the relay node to report information associated with path planning of the relay node, the information associated with the path planning as reported by the relay node includes, but is not limited to, the following information: related description of map elements, grid label arrangement, identification arrangement of roadside devices, coincidence distance and time with a given path, and deviation information from the given path planning.

For example, information associated with path planning of a relay node may be a road segment, a distance, a driving time, and so on.

When the relay request message transmitted by the remote terminal requires the relay node to report part of specific information in the information associated with the path planning, the relay node reports according to indication of the remote terminal.

For example, the relay request message indicates that the relay node requires to report the driving time on road segment x. Assuming that the driving time of the relay node on road segment x is 15 min, the information associated with the path planning as reported by the relay node to the remote terminal is 15 min.

It should be noted that the given information associated with path planning is only an example of information associated with path planning of the relay node in an embodiment of the present application. Any other information associated with the path planning falls within the protection scope of the embodiments of the present application.

2. Information associated with a vector speed of a relay node.

When the relay request message transmitted by the remote terminal requires the relay node to report information associated with a vector speed of the relay node, the information associated with the vector speed as reported by the relay node includes, but is not limited to, the following information: a traveling road segment, a moving direction, a moving speed and an angle of the relay node, deviation information from a given vector speed range, etc.

For example, the information associated with a vector speed in the relay condition information transmitted by the relay node is: road segment x, southbound, 80 km/h.

When the relay request message transmitted by the remote terminal requires the relay node to report part of specific information in the information associated with the vector speed, the relay node reports according to indication of the remote terminal.

For example, the relay request message indicates that the relay node requires to report a moving speed. Assuming that the moving speed of the relay node is 60 km/h, the information associated with the vector speed as reported by the relay node to the remote terminal is 60 km/h.

It should be noted that the given information associated with a vector speed is only an example of information associated with a vector speed of the relay node in an embodiment of the present application. Any other information associated with the vector speed falls within the protection scope of the embodiments of the present application.

3. Information associated with a service which a relay node contributes.

When the relay request message transmitted by the remote terminal requires the relay node to report information associated with a service which the relay node contributes, the information associated with the service in participation as reported by the relay node may be a service set which the relay node contributes, or information about whether or not to participate in a service in a given service set.

For example, the information associated with a service which a relay node contributes in the relay condition information transmitted by the relay node is: a service set which the relay node contributes {cooperative decision service, remote driving service}, or a service set which the relay node contributes {service with priority 1, service with priority 3}, or a service set which the relay node contributes {service with service id 001, service with service id 007}.

For example, if a service set which the relay node contributes is {basic road safety service, video forwarding service}, and a given service set is {cooperative decision service}; the information associated with the service supported by the relay node in the relay condition information transmitted by the relay node is no.

When the relay request message transmitted by the remote terminal requires the relay node to report part of specific information in the information associated with the service in participation, the relay node reports according to indication of the remote terminal.

For example, the remote terminal notifies the relay node of the given service set through the relay request message, and instructs the relay node to report the number of services in participation contained in the given service set. Assuming that two services which the relay node contributes are in the given service set, the information associated with the services in participation as reported by the relay node is 2.

It should be noted that the given service set in participation is only an example of information associated with a service which the relay node contributes in an embodiment of the present application. Any other information associated with the service in participation falls within the protection scope of the embodiments of the present application.

4. Information associated with a service indicator which a relay node contributes.

When the relay request message transmitted by the remote terminal requires the relay node to report information associated with a service indicator which the relay node contributes, the information associated with the service indicator in participation as reported by the relay node may be a service indicator set which the relay node contributes, or information about whether or not to participate in a service in a given service indicator set.

For example, the information associated with a service indicator which a relay node contributes in the relay condition information transmitted by the relay node is: a service indicator set which the relay node contributes {delay indicator 20 ms, reliability indicator 99%, coverage indicator 500 m, data rate indicator 5 Mbps, and number of supported terminals 200}.

For example, if a service set supported by the relay node is {reliability indicator 99%}, and a given service set is {reliability indicator 99.99%}; the information associated with the service supported by the relay node in the relay condition information transmitted by the relay node is no.

When the relay request message transmitted by the remote terminal requires the relay node to report part of specific information in the information associated with the service indicator in participation, the relay node reports according to indication of the remote terminal.

For example, the remote terminal instructs, through the relay request message, the relay node to report the delay indicator of the service in participation. Assuming that the delay indicator of the service which the relay node contributes is 20 ms, the information associated with the service indicator in participation as reported by the relay node is 20 ms.

5. Information associated with a service supported by a relay node.

When the relay request message transmitted by the remote terminal requires the relay node to report information associated with a service supported by the relay node, the information associated with the supported service as reported by the relay node may be a service set supported by the relay node, or information about whether or not to support a service in a given service set.

For example, the information associated with a service supported by a relay node in the relay condition information transmitted by the relay node is: a service set supported by the relay node {basic road safety service, video forwarding service}, or a service set supported by the relay node {service with priority less than 7}, or a service set supported by the relay node {service with service id 001, service with service id 007}.

For example, if a service set supported by the relay node is {basic road safety service, video forwarding service}, and a given service set is {cooperative decision service}; the information associated with the service supported by the relay node in the relay condition information transmitted by the relay node is no.

When the relay request message transmitted by the remote terminal requires the relay node to report part of specific information in the information associated with the supported service, the relay node reports according to indication of the remote terminal.

For example, the remote terminal notifies the relay node of the given service set through the relay request message, and instructs the relay node to report the number of supported services contained in the given service set. Assuming that three services supported by the relay node are in the given service set, the information associated with the supported services as reported by the relay node is 3.

It should be noted that the supported service set given above is only an example of information associated with a service supported by the relay node in an embodiment of the present application. Any other information associated with the supported service falls within the protection scope of the embodiments of the present application.

6. Information associated with a service indicator supported by a relay node.

When the relay request message transmitted by the remote terminal requires the relay node to report information associated with a service indicator supported by the relay node, the information associated with the supported service indicator as reported by the relay node may be a service indicator set supported by the relay node, or information about whether or not to support a service in a given service indicator set.

For example, the information associated with a service indicator supported by a relay node in the relay condition information transmitted by the relay node is: a service indicator set supported by the relay node {delay indicator 20 ms, reliability indicator 99%, coverage indicator 500 m, data rate indicator 5 Mbps, and number of supported terminals 200}.

For example, if a service set supported by the relay node is {reliability indicator 99%}, and a given service set is {reliability indicator 99.99%}; the information associated with the service supported by the relay node in the relay condition information transmitted by the relay node is no.

When the relay request message transmitted by the remote terminal requires the relay node to report part of specific information in the information associated with the supported service indicator, the relay node reports according to indication of the remote terminal.

For example, the remote terminal instructs, through the relay request message, the relay node to report the reliability indicator of the supported service. Assuming that the service indicator supported by the relay node is 97%, the information associated with the service indicator in participation as reported by the relay node is 97%.

7. Information associated with transmission power of a relay node.

Information associated with transmission power of a relay node may be an actual transmission power value of the relay node, or a power level, or other indicators that can indicate the transmission power capability.

For example, the information associated with transmission power of a relay node in the relay condition information transmitted by the relay node is 26 dBm, or level 2.

It should be noted that the actual transmission power value and power level of the relay node given above are only examples of information associated with transmission power of the relay node in an embodiment of the present application. Any other information associated with the transmission power falls within the protection scope of the embodiments of the present application.

8. Information associated with a sending resource pool used by a relay node.

When the relay request message transmitted by the remote terminal requires the relay node to report information associated with a sending resource pool used by the relay node itself, the information associated with the sending resource pool used by the relay node may be the sending resource pool used by the relay node, or whether the resource pool used by the relay node overlaps with a given resource pool.

For example, if the sending resource pool used by the relay node is resource pool x, the information associated with the sending resource pool used by the relay node in the relay condition information transmitted by the relay node is resource pool x.

For example, if the sending resource pool used by the relay node is resource pool x, the given resource pool is y, x and y do not overlap, the information associated with the sending resource pool used by the relay node in the relay condition information transmitted by the relay node is no.

When the relay request message transmitted by the remote terminal requires the relay node to report part of specific information in the information associated with the used sending resource pool, the relay node reports according to indication of the remote terminal.

For example, the remote terminal notifies the relay node of the given resource pool through the relay request message, and instructs the relay node to report the number of overlaps between the used sending resource pool and the given resource pool. Assuming that the relay node determines that the number of overlaps between the used sending resource pool and the given resource pool is 5, the information associated with the used sending resource pool as reported by the relay node is 5.

It should be noted that the used sending resource pool given above is only an example of information associated with the sending resource pool used by the relay node in an embodiment of the present application. Any other information associated with the used sending resource pool falls within the protection scope of the embodiments of the present application.

9. Information associated with a transmission mode of a relay node.

Information associated with a transmission mode of a relay node is the transmission mode currently used by the relay node, or whether the transmission mode currently used by the relay node belongs to a given transmission mode set.

For example, if the transmission mode currently used by the relay node is mode 3, the information associated with the transmission mode of the relay node in the relay condition information transmitted by the relay node is mode 3.

For example, if the transmission mode currently used by the relay node is mode 3, and the given transmission mode set is high {mode 3, mode 4}, the information associated with the transmission mode of the relay node in the relay condition information transmitted by the relay node is yes.

10. Information associated with a release version of a relay node.

Information associated with a release version of a relay node is the release version currently used by the relay node, or whether the release version currently used by the relay node belongs to a given release version set.

For example, if the release version currently used by the relay node is Release 14, the information associated with the release version of the relay node in the relay condition information transmitted by the relay node is Release 14.

For example, if the release version currently used by the relay node is Release 14, and the given release version set is higher than Release 13, the information associated with the release version of the relay node in the relay condition information transmitted by the relay node is yes.

11. information associated with channel measurement between a relay node and a specific device.

When the relay request message transmitted by the remote terminal requires the relay node to report information associated with channel measurement between the relay node and the remote terminal, the information associated with the channel measurement between the relay node and the remote terminal as reported by the relay node includes, but is not limited to, the following information: RSSI, RSRP, RSRQ and an interference measurement value obtained by the relay node by measuring the remote terminal.

When the relay request message transmitted by the remote terminal requires the relay node to report part of specific information in the information associated with the channel measurement between the relay node and the remote terminal, the relay node reports according to indication of the remote terminal.

For example, if the relay request message instructs the relay node to report RSSI obtained by the relay node by measuring the remote terminal, the information associated with the channel measurement between the relay node and the remote terminal as reported by the relay node is an RSSI value obtained by measuring the remote terminal.

Case 3: The relay request message includes the preset relay condition that is required to be satisfied by the target relay node, and configured for instructing the relay node of the relay request message to report whether to satisfy the preset relay condition, or configured for instructing the relay node satisfying the preset relay condition to report the relay condition information.

For example, the preset relay condition contained in the relay request message and required to be satisfied by the target relay node is that transmission mode information of the target relay node is contained in a given transmission mode. The relay node determines whether its own transmission mode is within the given transmission mode; if so, the relay condition is satisfied, and the relay node reports "yes" to the remote terminal; if not, the relay condition is not satisfied, and the relay node reports "no" to the remote terminal. Or, only when the relay node determines that its transmission mode is within the given transmission mode, the relay node reports the relay condition information to the remote terminal.

When the first device is a remote terminal, the remote terminal selects a target relay node from the at least one relay node according to the following modes: the first device using a relay node that satisfies a preset relay condition as a target relay node according to relay condition information transmitted by each relay node, and/or channel measurement information detected by the specific device for each relay node.

The specific device is at least one of the following devices: the first device, the remote terminal, the target node, other terminals with measurement capability, or a network-side device.

It should be noted that, when the specific device is not the first device, the specific device needs to report the measured channel measurement information of each relay node to the first device.

The preset relay condition includes at least one of the following conditions.

Condition 1, consistency between path planning information of the target relay node and a preset path satisfies at least one of the following requirements: first, the consistency being not less than one or more preset thresholds; and second, the consistency being one of top N1 in an order of consistency between path planning information of all relay nodes and the preset path from high to low, where the preset path is a preset path range, or a path associated with a remote terminal, or a path associated with a target node, or a path associated with a path type.

Regarding the first requirement in Condition 1, one or more thresholds are preset, and when the consistency between the path planning information of the relay node and the preset path is not less than the one or more preset thresholds, it is determined that the relay node satisfies the first requirement in Condition 1.

Regarding the second requirement in Condition 1, the consistency between the path planning information of all relay nodes and the preset path is determined, and sorted according to the consistency level from high to low. For any relay node, if the consistency between the path planning information of the relay node and the preset path is in the top N1 of the order, it is determined that the relay node satisfies the second requirement in Condition 1, where N1 is a preset integer value.

For example, the relay nodes that send the report message are: relay node 1, relay node 2, relay node 3, relay node 4, relay node 5, relay node 6; and the order according to the consistency between the path planning information of the relay nodes and the preset path from high to low is: relay node 6, relay node 4, relay node 3, relay node 2, relay node 1, relay node 5; assuming that N1 is 2, then relay node 6 and relay node 4 satisfy Condition 1.

It should be noted that the consistency between the path planning information of the relay node and the preset path can be determined by factors such as the same route, the required driving time of the path, and the distance of the path.

For example, assuming that the consistency between the path planning information of the relay node and the preset path is determined according to the same route, if the same route between the path planning information of the relay node and the preset path accounts for 80% of the total route, the consistency between the path planning information of the relay node and the preset path is 80%.

Condition 2, consistency between vector speed information of the target relay node and a preset vector speed satisfies at least one of the following requirements: first, the consistency being not less than one or more preset thresholds; and second, the consistency being one of top N2 in an order of consistency between vector speed information of all relay nodes and the preset vector speed from high to low, where the preset vector speed is a preset vector speed range, or a vector speed associated with a remote terminal, or a vector speed associated with a target node.

Regarding the first requirement in Condition 2, one or more thresholds are preset, and when the consistency between the vector speed information of the relay node and the preset vector speed is not less than the one or more preset thresholds, it is determined that the relay node satisfies the first requirement in Condition 2.

Regarding the second requirement in Condition 2, the consistency between the vector speed information of all relay nodes and the preset vector speed is determined, and sorted according to the consistency level from high to low. For any relay node, if the consistency between the vector speed information of the relay node and the preset vector speed is in the top N2 in the order, it is determined that the relay node satisfies the second requirement in Condition 2, where N2 is a preset integer value.

For example, the relay nodes that send the report message are: relay node 1, relay node 2, relay node 3, relay node 4, relay node 5, relay node 6; and the order according to the consistency between the vector speed information of the relay nodes and the preset vector speed from high to low is: relay node 6, relay node 4, relay node 3, relay node 2, relay node 1, relay node 5; assuming that N2 is 2, then relay node 6 and relay node 4 satisfy the second requirement in Condition 2.

It should be noted that the consistency between the vector speed information of the relay node and the preset vector speed can be measured according to a direction angle being less than a given angle threshold, and/or a relative speed being less than a given speed threshold.

Condition 3, a service which the target relay node contributes satisfies at least one of the following requirements: first, containing a number of services in a given service set that is less than a first preset threshold; second, containing a number of services in the given service set that is one of top N3 in an order of a number of services contained by all relay nodes in the given service set from low to high; and third, one or more service indicators therein being one of top N4 in an order of one or more service indicators of all relay nodes from poor to good.

Regarding the first requirement in Condition 3, a given service set is preset, and when the service which the relay node contributes contains the number of services in the given service set that is less than the first preset threshold, it is determined that the relay node satisfies the first requirement in Condition 3.

For example, the given service set is: {service a, service b, service c, service d, service e, service f, service g}, and it is assumed that the first preset threshold is 3; when the services which the relay node contributes are: service a, service f, service m, it is determined that the services which the relay node contributes contain the number of services in the given service set that is 2, and it is determined that the relay node satisfies the first requirement in Condition 3.

Regarding the second condition in Condition 3, it is determined that the services which each relay node contributes contain the number of services in the given service set, and the number of services contained by all relay nodes in the given service set is sorted from low to high. For any relay node, if the services which the relay node contributes contain the number of services in the given service set that is in the top N3 of the order, it is determined that the relay node satisfies the second condition in Condition 3, where N3 is a preset integer value.

Regarding the third requirement in Condition 3, one or more service indicators in the service which each relay node contributes are determined, and the one or more service indicators are sorted from poor to good. For any relay node, if the service which the relay node contributes contains one or more service indicators in the top N4 of the order, it is determined that the relay node satisfies the third requirement in Condition 3, where N4 is a preset integer value. For example, assuming that the service indicator which the relay node contributes is considered as the reliability indicator, the reliability indicator of the service which each relay node contributes is determined, and sorted according to the reliability level from low to high; or assuming that the service indicator which the relay node contributes is considered as the delay indicator, the delay indicator of the service which each relay node contributes is determined, and sorted according to the delay level from large to small.

Condition 4, a service supported by the target relay node satisfies at least one of the following requirements: first, containing a number of services in a given service set that is greater than a second preset threshold; second, containing a number of services in the given service set that is one of top N5 in an order of a number of services contained by all relay nodes in the given service set from high to low; and third, one or more service indicators therein being one of top N6 in an order of one or more service indicators of all relay nodes from good to poor.

Regarding the first requirement in Condition 4, a given service set is preset, and when the services that can be supported by the relay node contain the number of services in the given service set that is greater than the second preset threshold, it is determined that the relay node satisfies the first requirement in Condition 4.

For example, the given service set is: {service a, service b, service c, service d, service e, service f, service g}, and it is assumed that the second preset threshold is 3; when the services that can be supported by the relay node are: service a, service h, service c, service f, service m, it is determined that the services that can be supported by relay node contain the number of services in the given service set that is 4, and it is determined that the relay node satisfies the first requirement in Condition 4.

Regarding the second requirement in Condition 4, it is determined that the services that can be supported by each relay node contain the number of services in the given service set, and the number of services that can be supported by all relay nodes and contained in the given service set is sorted from high to low. For any relay node, if the services that can be supported by the relay node contain the number of services in the given service set that is in the top N5 of the order, it is determined that the relay node satisfies the second requirement in Condition 4, where N5 is a preset integer value.

Regarding the third requirement in Condition 4, one or more service indicators in the service supported by each relay node are determined, and the one or more service indicators are sorted from good to poor. For any relay node, if the service supported by the relay node contains one or more service indicators in the top N6 of the order, it is determined that the relay node satisfies the third requirement in Condition 4, where N6 is a preset integer value. For example, assuming that the service indicator supported by the relay node is considered as the reliability indicator, the reliability indicator of the service supported by each relay node is determined, and sorted according to the reliability level from high to low; or assuming that the service indicator supported by the relay node is considered as the delay indicator, the delay indicator of the service supported by each relay node is determined, and sorted according to the delay level from small to large.

Condition 5, transmission power of the target relay node satisfies at least one of the following requirements: first, the transmission power being not less than one or more preset thresholds; and second, the transmission power being one of top N7 in an order of transmission power of all relay nodes from high to low.

Regarding the first requirement in Condition 5, one or more thresholds are preset, and when the transmission power of the relay node is not less than the one or more preset thresholds, it is determined that the relay node satisfies the first requirement in Condition 5.

Regarding the second requirement in Condition 5, the transmission power of all relay nodes is determined, and sorted according to the transmission power level from high to low. For any relay node, if the transmission power of the relay node is in the top N7 of the order, it is determined that the relay node satisfies the second requirement in Condition 5, where N7 is a preset integer value.

For example, the relay nodes that send the report message are: relay node 1, relay node 2, relay node 3, relay node 4, relay node 5, relay node 6; and the order according to the transmission power of the relay nodes from high to low is: relay node 6, relay node 4, relay node 3, relay node 2, relay node 1, relay node 5; assuming that N7 is 2, then relay node 6 and relay node 4 satisfy the second requirement in Condition 5.

Condition 6, a sending resource pool of the target relay node satisfies at least one of the following requirements: first, being included in a given resource pool; second, being excluded from the given resource pool; third, overlapped resources with the given resource pool not exceeding a preset range; and fourth, a number of overlapped resources with the given resource pool being one of top N8 in an order of a number of overlapped resources of sending resource pools of all relay nodes and the given resource pool from low to high.

Regarding the first requirement in Condition 6, a given resource pool is preset; when the sending resource pool of the relay node is included in the preset given resource pool, it is determined that the relay node satisfies the first requirement in Condition 6. For example, the given resource pool is {resource pool 1, resource pool 2, resource pool 3, resource pool 4, resource pool 5}, and assuming that the sending resource pool of the relay node is resource pool 3, it is determined that the sending resource pool of the relay node is included in the given resource pool, and the relay node satisfies the first requirement in Condition 6.

Regarding the second requirement in Condition 6, a given resource pool is preset; when the sending resource pool of the relay node is excluded from the preset given resource pool, it is determined that the relay node satisfies the second requirement in Condition 6. For example, the given resource pool is {resource pool 1, resource pool 2; resource pool 3, resource pool 4, resource pool 5}, and assuming that the sending resource pool of the relay node is resource pool 7, it is determined that the sending resource pool of the relay node is excluded from the given resource pool, and the relay node satisfies the second requirement in Condition 6.

Regarding the third requirement in Condition 6, a given resource pool is preset, and a preset range is preset; a number of overlapped resources between the sending resource pool of the relay node and the given resource pool is determined; if the number of overlapped resources corresponding to the relay node is within the preset range, it is determined that the relay node satisfies the third requirement in Condition 6.

For example, the given resource pool is {source pool X}, and the preset range is 100 time domain and/or frequency domain resources; if the sending resource pool of the relay node is {resource pool Y}, the number of overlapped resources between the sending resource pool of the relay node and the given resource pool is 90 time domain and/or frequency domain resources within the preset range, then it is determined that the relay node satisfies the third requirement in Condition 6.

Regarding the fourth requirement in Condition 6, the number of overlapped resources between all relay nodes and the given resource pool is determined, and sorted according to the amounts of the overlapped resources from low to high. For any relay node, if the number of overlapped resources between the relay node and the given resource pool is in the top N8 of the order, it is determined that the relay node satisfies the fourth requirement in Condition 6, where N8 is a preset integer value.

Condition 7, transmission mode information of a relay node satisfies at least one of the following requirements: first, being included in a given transmission mode; and second, being excluded from the given transmission mode.

Regarding the first requirement in Condition 7, a given transmission mode is preset; if the transmission mode information of the relay node is in the preset given transmission mode, it is determined that the relay node satisfies the first requirement in Condition 7. For example, the given transmission mode is {mode 3, mode 4}, and if the transmission mode of the relay node is mode 3, it is determined that the relay node satisfies the first requirement in Condition 7.

Regarding the second requirement in Condition 7, a given transmission mode is preset; if the transmission mode information of the relay node is excluded from the preset given transmission mode, it is determined that the relay node satisfies the second requirement in Condition 7. For example, the given transmission mode is {mode 3, mode 4}, and if the transmission mode of the relay node is mode 2, it is determined that the relay node satisfies the second requirement in Condition 7.

Condition 8, release version information of a relay node satisfies at least one of the following requirements: first, being included in a given release version; and second, being excluded from the given release version.

Regarding the first requirement in Condition 8, a given release version is preset; if the release version information of the relay node is in the preset given release version, it is determined that the relay node satisfies the first requirement in Condition 8. For example, the given release version is {Release 12, Release 13, Release 14}, and if the release version of the relay node is Release 13, it is determined that the relay node satisfies the first requirement in Condition 8.

Regarding the second requirement in Condition 8, a given release version is preset; if the release version information of the relay node is excluded from the preset given release version, it is determined that the relay node satisfies the second requirement in Condition 8. For example, the given release version is {Release 12, Release 13}, and if the release version of the relay node is Release 14, it is determined that the relay node satisfies the second requirement in Condition 8.

Condition 9, channel measurement information measured by a relay node with a remote terminal satisfies at least one of the following requirements: first, the channel measurement information being not worse than one or more preset thresholds; and second, part or all of the channel measurement information being one of top N9 in an order of part or all of channel measurement information of all relay nodes from good to poor.

Regarding the first requirement in Condition 9, one or more thresholds are preset for channel measurement information. For example, if channel measurement information includes RSSI, RSRP, RSRQ, and an interference measurement value, a threshold is set for each information. When the channel measurement information is RSSI, the first condition can be expressed as the RSSI measured by the relay node with the remote terminal being not less than the threshold; when the channel measurement information is RSRP, the first requirement can be expressed as the RSRP measured by the relay node with the remote terminal being not less than the threshold; when the channel measurement information is RSRQ, the first requirement can be expressed as the RSRQ measured by the relay node with the remote terminal being not less than the threshold; when the channel measurement information is an interference measurement value, the first requirement can be expressed as the interference measurement value measured by the relay node with the remote terminal being not less than the threshold.

Regarding the second requirement in Condition 9, part or all of the channel measurement information measured by each relay node with the remote terminal is determined; according to the good or poor channel measurement information, the relay nodes are sorted according to the channel measurement information from good to poor. For any relay node, if the channel measurement information measured by the relay node with the remote terminal is in the top N9 of the order, it is determined that the relay node satisfies the second condition in Condition 9, where N9 is a preset integer value.

For example, when the channel measurement information is RSSI, the RSSI measured by each relay node with the remote terminal is determined, and sorted according to the RSSI level from large to small, then the top N9 relay nodes in the order satisfy the second requirement in Condition 9; when the channel measurement information is RSRP, the RSRP measured by each relay node with the remote terminal is determined, and sorted according to the RSRP level from large to small, then the top N9 relay nodes in the order satisfy the second requirement in Condition 9; when the channel measurement information is RSRQ, the RSRQ measured by each relay node with the remote terminal is determined, and sorted according to the RSRQ level from large to small, then the top N9 relay nodes in the order satisfy the second requirement in Condition 9; when the channel measurement information is an interference measurement value, the interference measurement value measured by each relay node with the remote terminal is determined, and sorted according to the interference measurement value level from large to small, then the top N9 relay nodes in the order satisfy the second requirement in Condition 9.

Condition 10, channel measurement information measured by a relay node with a target node satisfies at least one of the following requirements: first, the channel measurement information being not worse than one or more preset thresholds; and second, part or all of the channel measurement information being one of top N10 in an order of part or all of channel measurement information of all relay nodes from good to poor.

Regarding the first requirement in Condition 10, one or more thresholds are preset for channel measurement information. For example, if channel measurement information includes RSSI, RSRP, RSRQ, and an interference measurement value, a threshold is set for each information. When the channel measurement information is RSSI, the first condition can be expressed as the RSSI measured by the relay node with the target node being not less than the threshold; when the channel measurement information is RSRP, the first condition can be expressed as the RSRP measured by the relay node with the target node being not less than the threshold; when the channel measurement information is RSRQ, the first condition can be expressed as the RSRQ measured by the relay node with the target node being not less than the threshold; when the channel measurement information is an interference measurement value, the first condition can be expressed as the interference measurement value measured by the relay node with the target node being not less than the threshold.

Regarding the second requirement in Condition 10, part or all of the channel measurement information measured by each relay node with the target node is determined; according to the good or poor channel measurement information, the relay nodes are sorted according to the channel measurement information from good to poor. For any relay node, if the channel measurement information measured by the relay node with the target node is in the top N10 of the order, it is determined that the relay node satisfies the second requirement in Condition 10, where N10 is a preset integer value.

For example, when the channel measurement information is RSSI, the RSSI measured by each relay node with the target node is determined, and sorted according to the RSSI level from large to small, then the top N10 relay nodes in the order satisfy the second requirement in Condition 10; when the channel measurement information is RSRP, the RSRP measured by each relay node with the target node is determined, and sorted according to the RSRP level from large to small, then the top N10 relay nodes in the order satisfy the second requirement in Condition 10; when the channel measurement information is RSRQ, the RSRQ measured by each relay node with the target node is determined, and sorted according to the RSRQ level from large to small, then the top N10 relay nodes in the order satisfy the second requirement in Condition 10; when the channel measurement information is an interference measurement value, the interference measurement value measured by each relay node with the target node is determined, and sorted according to the interference measurement value level from large to small, then the top N10 relay nodes in the order satisfy the second requirement in Condition 10.

Condition 11, channel measurement information measured by the specific device with the relay node satisfies at least one of the following requirements: first, the channel measurement information being not worse than one or more preset thresholds; and second, part or all of the channel measurement information being one of top N11 in an order of part or all of channel measurement information of all relay nodes from good to poor.

Regarding the first requirement in Condition 11, one or more thresholds are preset for channel measurement information. For example, if channel measurement information includes RSSI, RSRP, RSRQ, and an interference measurement value, a threshold is set for each information. When the channel measurement information is RSSI, the first requirement can be expressed as the RSSI measured by the specific device with the relay node being not less than the threshold; when the channel measurement information is RSRP, the first requirement can be expressed as the RSRP measured by the specific device with the relay node being not less than the threshold; when the channel measurement information is RSRQ, the first requirement can be expressed as the RSRQ measured by the specific device with the relay node being not less than the threshold; when the channel measurement information is an interference measurement value, the first requirement can be expressed as the interference measurement value measured by the specific device with the relay node being not less than the threshold.

Regarding the second requirement in Condition 11, part or all of the channel measurement information measured by the specific device with each relay node is determined; according to the good or poor channel measurement information, the relay nodes are sorted according to the channel measurement information from good to poor. For any relay node, if the channel measurement information measured by the specific device with the relay node is in the top N11 of the order, it is determined that the relay node satisfies the second requirement in Condition 11, where N11 is a preset integer value.

For example, when the channel measurement information is RSSI, the RSSI measured by the specific device with each relay node is determined, and sorted according to the RSSI level from large to small, then the top N11 relay nodes in the order satisfy the second requirement in Condition 11; when the channel measurement information is RSRP, the RSRP measured by the specific device with each relay node is determined, and sorted according to the RSRP level from large to small, then the top N11 relay nodes in the order satisfy the second requirement in Condition 11; when the channel measurement information is RSRQ, the RSRQ measured by the specific device with each relay node is determined, and sorted according to the RSRQ level from large to small, then the top N11 relay nodes in the order satisfy the second requirement in Condition 11; when the channel measurement information is an interference measurement value, the interference measurement value measured by the specific device with each relay node is determined, and sorted according to the interference measurement value level from large to small, then the top N11 relay nodes in the order satisfy the second requirement in Condition 11.

Optionally, if the preset relay condition includes a plurality of conditions, the remote terminal selects a target relay node from the at least one relay node according to a weight value corresponding to each condition.

Specifically, if the preset relay condition includes a plurality of conditions, the remote terminal scores each condition according to the weight value corresponding to each condition, and selects the target relay node from the at least one relay node according to the score of each relay node.

It should be noted that if a plurality of relay nodes satisfying the above preset relay condition exist according to the above method for selecting a target relay node, the remote terminal randomly selects the target relay node from the plurality of relay nodes satisfying the preset relay condition.

II. The first device is a network-side device or a third-party device.

Figure 6:
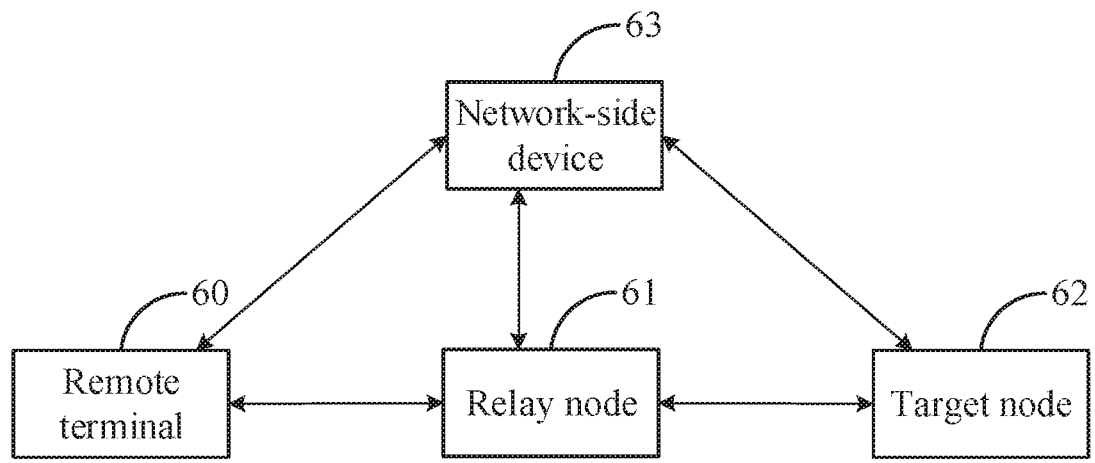
FIG. 6 is a schematic structural diagram of a second relay node selection system according to an embodiment of the present application.

In this condition, description is made by taking the first device being a network-side device as an example. As shown in FIG. 6, a system for selecting a relay node in an embodiment of the present application includes a remote terminal 60, at least one relay node 61, a target node 62, and a network-side device 63.

The network-side device 63 is configured for receiving relay condition information transmitted by at least one relay node 61; selecting a target relay node from the at least one relay node according to relay condition information transmitted by each relay node, and/or channel measurement information for each relay node.

The remote terminal 60 is configured for establishing a connection with the target node 62 via the target relay node.

Optionally, the network-side device receives a relay request message transmitted by the remote terminal, where the relay request message includes the preset relay condition required to be satisfied by the target relay node.

The network-side device selects the target relay node from the at least one relay node according to the preset relay condition contained in the relay request message and required to be satisfied by the target relay node.

It should be noted that the way in which the network-side device selects the target relay node is the same as the way in which the remote terminal selects the target relay node according to preset relay condition, and details are not described herein again.

On the basis of the same inventive concept, an embodiment of the present application further provides a first device for selecting a relay node. The device is a device corresponding to the method for selecting a relay node in the embodiments of the present application, and the principle of the device to solve the problem is similar to the method. Therefore, the implementation of the device can refer to the implementation of the method, and details are not repeated here.

Figure 7:
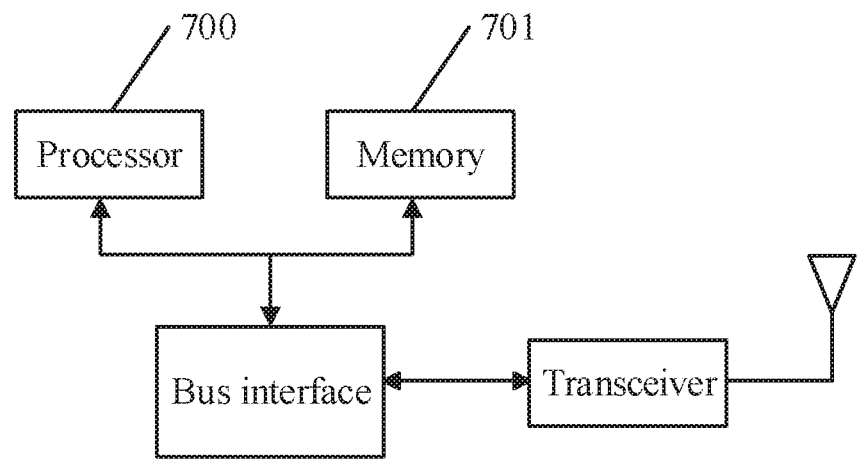
FIG. 7 is a first schematic structural diagram of a first device for selecting a relay node according to an embodiment of the present application.

As shown in FIG. 7, the first device for selecting a relay node according to an embodiment of the present application includes: a processor 700, a memory 701, a transceiver, and a bus interface.

The processor 700 is responsible for managing a bus architecture and general processing. The memory 701 may store data used by the processor 700 when performing an operation. The bus architecture may include any number of interconnected buses and bridges, which are linked by various circuits of one or more processors 700 and one or more memories 701. The bus architecture can also link various other circuits such as peripheral devices, voltage regulators and power management circuits, which are well known in the art. Therefore, further description is omitted herein. The bus interface provides one or more interfaces. The processor 700 is responsible for managing a bus architecture and general processing, and the memory 701 may store data used by the processor 700 when performing an operation.

The process disclosed in the embodiments of the present application may be applied to the processor 700 or implemented by the processor 700. In the implementation process, each step of the signal processing flow may be completed by an integrated logic circuit of hardware in the processor 700 or an instruction in the form of software. The processor 700 may be a general-purpose processor, a digital signal processor, an application specific integrated circuit, a field programmable gate array or other programmable logic device, a discrete gate or transistor logic device, or a discrete hardware component, and may implement or execute the methods, steps, and logical block diagrams disclosed in the embodiments of the present application. The general-purpose processor may be a microprocessor or any conventional processor, etc. The steps of the method disclosed in conjunction with the embodiments of the present application may be directly embodied to be executed by a hardware processor, or may be executed by a combination of hardware and software modules in the processor. The software module may be located in a mature storage medium in the art, such as a random-access memory, a flash memory, a read-only memory, a programmable read-only memory, an electrically erasable programmable memory, and a register. The storage medium is located in the memory 701, and the processor 700 reads the information in the memory 701 and completes the steps of the signal processing flow in combination with its hardware.

Specifically, the processor 700 is configured for reading one or more programs in the memory 701 and executing: receiving a report message transmitted by at least one relay node via the transceiver; and selecting a target relay node from the at least one relay node to enable a remote terminal to establish a connection with a target node via the target relay node.

Optionally, the processor 700 is further configured for: randomly selecting a target relay node from the at least one relay node; and/or selecting a target relay node from the at least one relay node according to channel measurement information detected by a specific device for each relay node.

Optionally, the report message includes relay condition information.

The processor 700 is specifically configured for: selecting a target relay node from the at least one relay node according to relay condition information transmitted by each relay node, and/or channel measurement information detected by a specific device for each relay node.

Optionally, the specific device is any one of the following devices: the first device, the remote terminal, the target node, other terminals with measurement capability, or a network-side device.

Optionally, the relay condition information includes any one of the following information: information associated with path planning of a relay node, information associated with a vector speed of a relay node, information associated with a service which a relay node contributes, information associated with a service indicator which a relay node contributes, information associated with a service supported by a relay node, information associated with a service indicator supported by a relay node, information associated with transmission power of a relay node, information associated with a sending resource pool used by a relay node, information associated with a transmission mode of a relay node, information associated with a release version of a relay node, information associated with channel measurement between a relay node and a remote terminal, and information associated with channel measurement between a relay node and a target node.

Optionally, the processor 700 is specifically configured for: using a relay node that satisfies a preset relay condition as a target relay node according to relay condition information transmitted by each relay node, and/or channel measurement information of the specific device for each relay node; The preset relay condition includes at least one of the following conditions.

Condition 1, consistency between path planning information of the target relay node and a preset path satisfies at least one of the following requirements: first, the consistency being not less than one or more preset thresholds; and second, the consistency being one of top N1 in an order of consistency between path planning information of all relay nodes and the preset path from high to low, where the preset path is a preset path range, or a path associated with a remote terminal, or a path associated with a target node, or a path associated with a path type.

Condition 2, consistency between vector speed information of the target relay node and a preset vector speed satisfies at least one of the following requirements: first, the consistency being not less than one or more preset thresholds; and second, the consistency being one of top N2 in an order of consistency between vector speed information of all relay nodes and the preset vector speed from high to low, where the preset vector speed is a preset vector speed range, or a vector speed associated with a remote terminal, or a vector speed associated with a target node.

Condition 3, a service which the target relay node contributes satisfies at least one of the following requirements: first, containing a number of services in a given service set that is less than a first preset threshold; second, containing a number of services in the given service set that is one of top N3 in an order of a number of services contained by all relay nodes in the given service set from low to high; and third, one or more service indicators therein being one of top N4 in an order of one or more service indicators of all relay nodes from poor to good.

Condition 4, a service supported by the target relay node satisfies at least one of the following requirements: first, containing a number of services in a given service set that is greater than a second preset threshold; second, containing a number of services in the given service set that is one of top N5 in an order of a number of services contained by all relay nodes in the given service set from high to low; and third, one or more service indicators therein being one of top N6 in an order of one or more service indicators of all relay nodes from good to poor.

Condition 5, transmission power of the target relay node satisfies at least one of the following requirements: first, the transmission power being not less than one or more preset thresholds; and second, the transmission power being one of top N7 in an order of transmission power of all relay nodes from high to low.

Condition 6, a sending resource pool of the target relay node satisfies at least one of the following requirements: first, being included in a given resource pool; second, being excluded from the given resource pool; third, overlapped resources with the given resource pool not exceeding a preset range; and fourth, a number of overlapped resources with the given resource pool being one of top N8 in an order of a number of overlapped resources of sending resource pools of all relay nodes and the given resource pool from low to high.

Condition 7, transmission mode information of a relay node satisfies at least one of the following requirements: first, being included in a given transmission mode; and second, being excluded from the given transmission mode.

Condition 8, release version information of a relay node satisfies at least one of the following requirements: first, being included in a given release version; and second, being excluded from the given release version.

Condition 9, channel measurement information measured by a relay node with a remote terminal satisfies at least one of the following requirements: first, the channel measurement information being not worse than one or more preset thresholds; and second, part or all of the channel measurement information being one of top N9 in an order of part or all of channel measurement information of all relay nodes from good to poor.

Condition 10, channel measurement information measured by a relay node with a target node satisfies at least one of the following requirements: first, the channel measurement information being not worse than one or more preset thresholds; and second, part or all of the channel measurement information being one of top N10 in an order of part or all of channel measurement information of all relay nodes from good to poor.

Condition 11, channel measurement information measured by the specific device with the relay node satisfies at least one of the following requirements: first, the channel measurement information being not worse than one or more preset thresholds; and second, part or all of the channel measurement information being one of top N11 in an order of part or all of channel measurement information of all relay nodes from good to poor.

Optionally, if the preset relay condition includes a plurality of conditions, the processor 700 is specifically configured for: selecting at least one target condition from the plurality of conditions; and selecting a target relay node from the at least one relay node according to a weight value corresponding to each of the at least one target condition.

Optionally, the processor 700 is further configured for: if a plurality of relay nodes satisfy the preset relay condition, randomly selecting the target relay node from the plurality of relay nodes satisfying the preset relay condition.

Optionally, when the first device is a network-side device or a third-party device, the processor 700 is further configured for: before selecting a target relay node from the at least one relay node, receiving a relay request message transmitted by the remote terminal, where the relay request message includes the preset relay condition required to be satisfied by the target relay node.

Optionally, when the first device is a remote terminal, the processor 700 is specifically configured for: receiving relay condition information directly transmitted by the at least one relay node; or receiving relay condition information transmitted by the at least one relay node through a network-side device or a third-party device.

Optionally, when the first device is a remote terminal, the processor 700 is further configured for: before receiving relay condition information transmitted by at least one relay node, sending a relay request message to the at least one relay node, where, the relay request message is configured for causing the relay node to return the relay condition information to the remote terminal after receiving the relay request message, and/or, the relay request message is configured for indicating the relay condition information that the relay node requires to report.

Optionally, when the first device is a remote terminal, the processor 700 is further configured for: before receiving relay condition information transmitted by at least one relay node, sending a relay request message to the at least one relay node, where the relay request message includes the preset relay condition required to be satisfied by the target relay node, so that the relay node that receives the relay request message reports whether to satisfy the preset relay condition, or the relay node satisfying the preset relay condition reports the relay condition information.

Optionally, the processor 700 is further configured for: directly sending a relay request message to the at least one relay node; or sending a relay request message to the at least one relay node through a network-side device or a third-party device.

Figure 8:
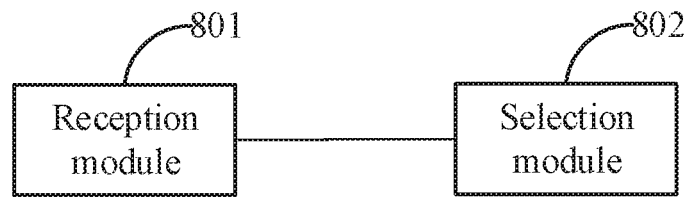
FIG. 8 is a second schematic structural diagram of a first device for selecting a relay node according to an embodiment of the present application.

As shown in FIG. 8, an embodiment of the present application provides another first device for selecting a relay node, including: a reception module 801 for receiving a report message transmitted by at least one relay node; and a selection module 802 for selecting a target relay node from the at least one relay node to enable a remote terminal to establish a connection with a target node by means of the target relay node.

Optionally, the selection module 802 is further configured for: randomly selecting a target relay node from the at least one relay node; and/or selecting a target relay node from the at least one relay node according to channel measurement information detected by a specific device for each relay node.

Optionally, the report message includes relay condition information; the selection module 802 is further configured for: selecting a target relay node from the at least one relay node according to relay condition information transmitted by each relay node, and/or channel measurement information detected by a specific device for each relay node.

Optionally, the specific device is any one of the following devices: the first device, the remote terminal, the target node, other terminals with measurement capability, or a network-side device.

Optionally, the relay condition information includes part or all of the following information: information associated with path planning of a relay node, information associated with a vector speed of a relay node, information associated with a service which a relay node contributes, information associated with a service indicator which a relay node contributes, information associated with a service supported by a relay node, information associated with a service indicator supported by a relay node, information associated with transmission power of a relay node, information associated with a sending resource pool used by a relay node, information associated with a transmission mode of a relay node, information associated with a release version of a relay node, information associated with channel measurement between a relay node and a remote terminal, and information associated with channel measurement between a relay node and a target node.

Optionally, the selection module 802 is further configured for: using a relay node that satisfies a preset relay condition as a target relay node according to relay condition information transmitted by each relay node, and/or channel measurement information of the specific device for each relay node.

The preset relay condition includes at least one of the following conditions.

Condition 1, consistency between path planning information of the target relay node and a preset path satisfies at least one of the following requirements: first, the consistency being not less than one or more preset thresholds; and second, the consistency being one of top N1 in an order of consistency between path planning information of all relay nodes and the preset path from high to low, where the preset path is a preset path range, or a path associated with a remote terminal, or a path associated with a target node, or a path associated with a path type.

Condition 2, consistency between vector speed information of the target relay node and a preset vector speed satisfies at least one of the following requirements: first, the consistency being not less than one or more preset thresholds; and second, the consistency being one of top N2 in an order of consistency between vector speed information of all relay nodes and the preset vector speed from high to low, where the preset vector speed is a preset vector speed range, or a vector speed associated with a remote terminal, or a vector speed associated with a target node.

Condition 3, a service which the target relay node contributes satisfies at least one of the following requirements: first, containing a number of services in a given service set that is less than a first preset threshold; second, containing a number of services in the given service set that is one of top N3 in an order of a number of services contained by all relay nodes in the given service set from low to high; and third, one or more service indicators therein being one of top N4 in an order of one or more service indicators of all relay nodes from poor to good.

Condition 4, a service supported by the target relay node satisfies at least one of the following requirements: first, containing a number of services in a given service set that is greater than a second preset threshold; second, containing a number of services in the given service set that is one of top N5 in an order of a number of services contained by all relay nodes in the given service set from high to low; and third, one or more service indicators therein being one of top N6 in an order of one or more service indicators of all relay nodes from good to poor.

Condition 5, transmission power of the target relay node satisfies at least one of the following requirements: first, the transmission power being not less than one or more preset thresholds; and second, the transmission power being one of top N7 in an order of transmission power of all relay nodes from high to low.

Condition 6, a sending resource pool of the target relay node satisfies at least one of the following requirements: first, being included in a given resource pool; second, being excluded from the given resource pool; third, overlapped resources with the given resource pool not exceeding a preset range; and fourth, a number of overlapped resources with the given resource pool being one of top N8 in an order of a number of overlapped resources of sending resource pools of all relay nodes and the given resource pool from low to high.

Condition 7, transmission mode information of a relay node satisfies at least one of the following requirements: first, being included in a given transmission mode; and second, being excluded from the given transmission mode.

Condition 8, release version information of a relay node satisfies at least one of the following requirements: first, being included in a given release version; and second, being excluded from the given release version.

Condition 9, channel measurement information measured by a relay node with a remote terminal satisfies at least one of the following requirements: first, the channel measurement information being not worse than one or more preset thresholds; and second, part or all of the channel measurement information being one of top N9 in an order of part or all of channel measurement information of all relay nodes from good to poor.

Condition 10, channel measurement information measured by a relay node with a target node satisfies at least one of the following requirements: first, the channel measurement information being not worse than one or more preset thresholds; and second, part or all of the channel measurement information being one of top N10 in an order of part or all of channel measurement information of all relay nodes from good to poor.

Condition 11, channel measurement information measured by the specific device with the relay node satisfies at least one of the following requirements: first, the channel measurement information being not worse than one or more preset thresholds; and second, part or all of the channel measurement information being one of top N11 in an order of part or all of channel measurement information of all relay nodes from good to poor.

Optionally, if the preset relay condition includes a plurality of conditions, the selection module 802 is further configured for: selecting at least one target condition from the plurality of conditions; and selecting a target relay node from the at least one relay node according to a weight value corresponding to each of the at least one target condition.

Optionally, the selection module 802 is further configured for: if a plurality of relay nodes satisfy the preset relay condition, randomly selecting the target relay node from the plurality of relay nodes satisfying the preset relay condition.

Optionally, when the first device is a network-side device or a third-party device, the reception module 801 is further configured for: receiving a relay request message transmitted by the remote terminal, where the relay request message includes the preset relay condition required to be satisfied by the target relay node.

Optionally, when the first device is a remote terminal, the reception module 801 is further configured for: receiving relay condition information directly transmitted by the at least one relay node; or receiving relay condition information transmitted by the at least one relay node through a network-side device or a third-party device.

Optionally, when the first device is a remote terminal, the reception module 801 is further configured for: before receiving relay condition information transmitted by at least one relay node, sending a relay request message to the at least one relay node, where, the relay request message is configured for causing the relay node to return the relay condition information to the remote terminal after receiving the relay request message, and/or, the relay request message is configured for indicating the relay condition information that the relay node requires to report.

Optionally, when the first device is a remote terminal, the reception module 801 is further configured for: before receiving relay condition information transmitted by at least one relay node, sending a relay request message to the at least one relay node, where the relay request message includes the preset relay condition required to be satisfied by the target relay node, so that the relay node that receives the relay request message reports whether to satisfy the preset relay condition, or the relay node satisfying the preset relay condition reports the relay condition information.

Optionally, the reception module 801 is further configured for: directly sending a relay request message to the at least one relay node; or sending a relay request message to the at least one relay node through a network-side device or a third-party device.

The terminal can also be called a user equipment (referred to as "UE"), mobile station (referred to as "MS"), mobile terminal, etc. Optionally, the terminal may have the ability to communicate with one or more core networks via a radio access network (RAN). For example, the terminal may be a mobile telephone (or so-called "cellular" telephone), or a computer of a mobile nature, etc. For example, the terminal may also be a portable, pocket, hand-held, computer-included, or vehicle-mounted mobile device.

The network-side device may be a base station (for example, an access point), which refers to a device that communicates with a wireless terminal through one or more sectors on an air interface in an access network. The base station can be configured for converting a received air frame and an IP packet to each other as a router between a wireless terminal and rest of the access network, where the rest of the access network can include an internet protocol (IP) network. The base station can also coordinate attribute management of the air interface. For example, the base station may be a base transceiver station (BTS) in GSM or CDMA, a base station (NodeB) in WCDMA, an evolutional Node B (NodeB or eNB or e-NodeB) in LTE, or a base station (gNB) in NR, which is not limited in the embodiments.

An embodiment of the present application provides a computer-storable medium, with one or more computer programs stored thereon, where the one or more computer programs, when executed by a processor, implements steps performed by the first device in the embodiments of the present application.

In specific implementation, the computer-storable medium in the embodiments of the present application may be a computer-readable storage medium, or may be any available medium or data storage device that can be accessed by a computer, including but not limited to a magnetic memory (such as floppy disk, hard disk, magnetic tape, magneto-optical disk (MO), etc.), optical memory (such as CD, DVD, BD, HVD, etc.), and semiconductor memory (such as ROM, EPROM, EEPROM, non-transitory memory (NAND FLASH), Solid. State Drive (SSD)), etc.

The present application is described above with reference to block diagrams and/or flow charts illustrating methods, devices (systems) and/or computer program products according to embodiments of the present application. It should be understood that one block of the block diagrams and/or flow charts and a combination of blocks of the block diagrams and/or flow charts can be implemented by computer program instructions. These computer program instructions can be provided to a processor of a general-purpose computer and a dedicated computer, and/or other programmable data processing devices to produce a machine, so that instructions executed via a computer processor and/or other programmable data processing devices create a method for implementing the functions/actions specified in the block diagrams and/or flow chart blocks.

Correspondingly, the present application can also be implemented in hardware and/or software (including firmware, resident software, microcode, etc.). Furthermore, the present application may take the form of a computer program product on a computer-usable or computer-readable storage medium, which has computer-usable or computer-readable program code implemented in the medium for use by or in connection with an instruction execution system. In the context of the present application, a computer-usable or computer-readable medium may be any medium that can contain, store, communicate, transmit or transport the program for use by or in connection with an instruction execution system, apparatus, or device.

Obviously, those skilled in the art can make various modifications and variations to the present application without departing from the spirit and scope of the present application. In this way, if these modifications and variations of the present application fall within the scope of the claims of the present disclosure and their equivalent art, the present application also intends to include these modifications and variations.

What is claimed is:

1. A method for selecting a relay node, comprising:
receiving, by a first device, a report message transmitted by at least one relay node, wherein the report message comprises relay condition information, wherein the relay condition information comprises at least one of the following information: information associated with path planning of a relay node, information associated with a vector speed of a relay node, information associated with a service which a relay node contributes, information associated with a service indicator which a relay node contributes, information associated with a service supported by a relay node, information associated with a service indicator supported by a relay node, information associated with transmission power of a relay node, information associated with a sending resource pool used by a relay node, information associated with a transmission mode of a relay node, information associated with a release version of a relay node, and information associated with channel measurement between a relay node and a specific device; and
selecting, by the first device, a target relay node from the at least one relay node, to enable a remote terminal to establish a connection with a target node via the target relay node;
wherein the selecting, by the first device, the target relay node from the at least one relay node, comprises:
  selecting, by the first device, at least two target conditions from a plurality of preset relay conditions, according to the relay condition information transmitted by the at least one relay node and/or channel measurement information detected by a specific device for each of the at least one relay node, wherein the specific device is at least one of following devices: the first device, the remote terminal, the target node, other terminals with measurement capability, and a network-side device;
  determining, by the first device, one or more relay nodes that satisfy at least one target condition of the at least two target conditions, from the at least one relay node; and
  selecting, by the first device, the target relay node from the one or more relay nodes that satisfy the at least one target condition of the at least two target conditions, according to a weight value corresponding to each of the at least two target conditions;
wherein the plurality of preset relay conditions comprise:
  condition 1, consistency between path planning information of a target relay node and a preset path satisfies at least one of following requirements:
    first requirement, the consistency being not less than one or more preset thresholds; and
    second requirement, the consistency being one of top N1 in an order of consistency between path planning information of all relay nodes and the preset path from high to low, wherein the preset path is a preset path range, or a path associated with a remote terminal, or a path associated with a target node, or a path associated with a path type;
  condition 2, consistency between vector speed information of a target relay node and a preset vector speed satisfies at least one of following requirements:
    first requirement, the consistency being not less than one or more preset thresholds; and second requirement, the consistency being one of top N2 in an order of consistency between vector speed information of all relay nodes and the preset vector speed from high to low, wherein the preset vector speed is a preset vector speed range, or a vector speed associated with a remote terminal, or a vector speed associated with a target node;

condition 3, a service which a target relay node contributes satisfies at least one of following requirements:
  first requirement, comprising a number of services in a given service set that is less than a first preset threshold;
  second requirement, comprising a number of services in a given service set that is one of top N3 in an order of a number of services comprised by all relay nodes in a given service set from low to high; and
  third requirement, one or more service indicators therein being one of top N4 in an order of one or more service indicators of all relay nodes from poor to good;

condition 4, a service supported by a target relay node satisfies at least one of following requirements:
  first requirement, comprising a number of services in a given service set that is greater than a second preset threshold;
  second requirement, comprising a number of services in a given service set that is one of top N5 in an order of a number of services comprised by all relay nodes in a given service set from high to low; and
  third requirement, one or more service indicators therein being one of top N6 in an order of one or more service indicators of all relay nodes from good to poor;

condition 5, transmission power of a target relay node satisfies at least one of following requirements:
  first requirement, the transmission power being not less than one or more preset thresholds; and
  second requirement, the transmission power being one of top N7 in an order of transmission power of all relay nodes from high to low;

condition 6, a sending resource pool of a target relay node satisfies at least one of following requirements:
  first requirement, being comprised in a given resource pool;
  second requirement, being excluded from a given resource pool;
  third requirement, overlapped resources with a given resource pool not exceeding a preset range; and
  fourth requirement, a number of overlapped resources with a given resource pool being one of top N8 in an order of a number of overlapped resources of sending resource pools of all relay nodes and a given resource pool from low to high;

condition 7, transmission mode information of a relay node satisfies at least one of following requirements:
  first requirement, being comprised in a given transmission mode; and
  second requirement, being excluded from a given transmission mode;

condition 8, release version information of a relay node satisfies at least one of following requirements:
  first requirement, being comprised in a given release version; and
  second requirement, being excluded from a given release version;

condition 9, channel measurement information measured by a relay node with a specific device satisfies at least one of following requirements:
  first requirement, the channel measurement information being not worse than one or more preset thresholds; and
  second requirement, part or all of the channel measurement information being one of top N9 in an order of part or all of channel measurement information of all relay nodes from good to poor;

condition 10, channel measurement information measured by a relay node with a target node satisfies at least one of following requirements:
  first requirement, the channel measurement information being not worse than one or more preset thresholds; and
  second requirement, part or all of the channel measurement information being one of top N10 in an order of part or all of channel measurement information of all relay nodes from good to poor;

condition 11, channel measurement information measured by the specific device with the relay node satisfies at least one of following requirements:
  first requirement, the channel measurement information being not worse than one or more preset thresholds; and
  second requirement, part or all of the channel measurement information being one of top N11 in an order of part or all of channel measurement information of all relay nodes from good to poor;

wherein N1, N2, N3, N4, N5, N6, N7, N8, N9, N10 and N11 are all integers.

2. The method according to claim 1, wherein when the first device is a network-side device or a third-party device, before the selecting, by the first device, the target relay node from the at least one relay node, the method further comprises:
  receiving, by the first device, a relay request message transmitted by the remote terminal, wherein the relay request message comprises a preset relay condition required to be satisfied by the target relay node;
  wherein the preset relay condition comprises at least one of following conditions:
  condition 1, consistency between path planning information of a target relay node and a preset path satisfies at least one of following requirements:
    first requirement, the consistency being not less than one or more preset thresholds; and
    second requirement, the consistency being one of top N1 in an order of consistency between path planning information of all relay nodes and the preset path from high to low, wherein the preset path is a preset path range, or a path associated with a remote terminal, or a path associated with a target node, or a path associated with a path type;
  condition 2, consistency between vector speed information of a target relay node and a preset vector speed satisfies at least one of following requirements:
    first requirement, the consistency being not less than one or more preset thresholds; and
    second requirement, the consistency being one of top N2 in an order of consistency between vector speed information of all relay nodes and the preset vector speed from high to low, wherein the preset vector speed is a preset vector speed range, or a vector speed associated with a remote terminal, or a vector speed associated with a target node;

condition 3, a service which a target relay node contributes satisfies at least one of following requirements:
first requirement, comprising a number of services in a given service set that is less than a first preset threshold;
second requirement, comprising a number of services in a given service set that is one of top N3 in an order of a number of services comprised by all relay nodes in a given service set from low to high; and
third requirement, one or more service indicators therein being one of top N4 in an order of one or more service indicators of all relay nodes from poor to good;

condition 4, a service supported by a target relay node satisfies at least one of following requirements:
first requirement, comprising a number of services in a given service set that is greater than a second preset threshold;
second requirement, comprising a number of services in a given service set that is one of top N5 in an order of a number of services comprised by all relay nodes in a given service set from high to low; and
third requirement, one or more service indicators therein being one of top N6 in an order of one or more service indicators of all relay nodes from good to poor;

condition 5, transmission power of a target relay node satisfies at least one of following requirements:
first requirement, the transmission power being not less than one or more preset thresholds; and
second requirement, the transmission power being one of top N7 in an order of transmission power of all relay nodes from high to low;

condition 6, a sending resource pool of a target relay node satisfies at least one of following requirements:
first requirement, being comprised in a given resource pool;
second requirement, being excluded from a given resource pool;
third requirement, overlapped resources with a given resource pool not exceeding a preset range; and
fourth requirement, a number of overlapped resources with a given resource pool being one of top N8 in an order of a number of overlapped resources of sending resource pools of all relay nodes and a given resource pool from low to high;

condition 7, transmission mode information of a relay node satisfies at least one of following requirements:
first requirement, being comprised in a given transmission mode; and
second requirement, being excluded from a given transmission mode;

condition 8, release version information of a relay node satisfies at least one of following requirements:
first requirement, being comprised in a given release version; and
second requirement, being excluded from a given release version;

condition 9, channel measurement information measured by a relay node with a specific device satisfies at least one of following requirements:
first requirement, the channel measurement information being not worse than one or more preset thresholds; and
second requirement, part or all of the channel measurement information being one of top N9 in an order of part or all of channel measurement information of all relay nodes from good to poor;

condition 10, channel measurement information measured by a relay node with a target node satisfies at least one of following requirements:
first requirement, the channel measurement information being not worse than one or more preset thresholds; and
second requirement, part or all of the channel measurement information being one of top N10 in an order of part or all of channel measurement information of all relay nodes from good to poor;

condition 11, channel measurement information measured by the specific device with the relay node satisfies at least one of following requirements:
first requirement, the channel measurement information being not worse than one or more preset thresholds; and
second requirement, part or all of the channel measurement information being one of top N11 in an order of part or all of channel measurement information of all relay nodes from good to poor;
wherein N1, N2, N3, N4, N5, N6, N7, N8, N9, N10 and N11 are all integers.

3. The method according to claim 1, wherein when the first device is the remote terminal, receiving, by the remote terminal, relay condition information transmitted by at least one relay node comprises:
receiving, by the remote terminal, the relay condition information directly transmitted by the at least one relay node; or
receiving, by the remote terminal, the relay condition information transmitted by the at least one relay node via a network-side device or a third-party device.

4. The method according to claim 1, wherein when the first device is the remote terminal, before the receiving, by the remote terminal, the relay condition information transmitted by the at least one relay node, the method further comprising:
transmitting, by the remote terminal, a relay request message to the at least one relay node, wherein, the relay request message is configured for causing the at least one relay node to return the relay condition information to the remote terminal after receiving the relay request message, and/or, the relay request message is configured for indicating the relay condition information that the relay node requires to report;
or, transmitting, by the remote terminal, a relay request message to the at least one relay node, wherein, the relay request message comprises a preset relay condition required to be satisfied by a target relay node, so that the relay node that receives the relay request message reports whether to satisfy the preset relay condition, or the relay node satisfying the preset relay condition reports the relay condition information;
wherein the preset relay condition comprises at least one of the following conditions:
condition 1, consistency between path planning information of a target relay node and a preset path satisfies at least one of following requirements:
first requirement, the consistency being not less than one or more preset thresholds; and
second requirement, the consistency being one of top N1 in an order of consistency between path planning information of all relay nodes and the preset path from high to low, wherein the preset path is a preset path range, or a path associated with a remote terminal, or a path associated with a target node, or a path associated with a path type;

condition 2, consistency between vector speed information of a target relay node and a preset vector speed satisfies at least one of following requirements:
first requirement, the consistency being not less than one or more preset thresholds; and
second requirement, the consistency being one of top N2 in an order of consistency between vector speed information of all relay nodes and the preset vector speed from high to low, wherein the preset vector speed is a preset vector speed range, or a vector speed associated with a remote terminal, or a vector speed associated with a target node;

condition 3, a service which a target relay node contributes satisfies at least one of following requirements:
first requirement, comprising a number of services in a given service set that is less than a first preset threshold;
second requirement, comprising a number of services in a given service set that is one of top N3 in an order of a number of services comprised by all relay nodes in a given service set from low to high; and
third requirement, one or more service indicators therein being one of top N4 in an order of one or more service indicators of all relay nodes from poor to good;

condition 4, a service supported by a target relay node satisfies at least one of following requirements:
first requirement, comprising a number of services in a given service set that is greater than a second preset threshold;
second requirement, comprising a number of services in a given service set that is one of top N5 in an order of a number of services comprised by all relay nodes in a given service set from high to low; and
third requirement, one or more service indicators therein being one of top N6 in an order of one or more service indicators of all relay nodes from good to poor;

condition 5, transmission power of a target relay node satisfies at least one of following requirements:
first requirement, the transmission power being not less than one or more preset thresholds; and
second requirement, the transmission power being one of top N7 in an order of transmission power of all relay nodes from high to low;

condition 6, a sending resource pool of a target relay node satisfies at least one of following requirements:
first requirement, being comprised in a given resource pool;
second requirement, being excluded from a given resource pool;
third requirement, overlapped resources with a given resource pool not exceeding a preset range; and
fourth requirement, a number of overlapped resources with a given resource pool being one of top N8 in an order of a number of overlapped resources of sending resource pools of all relay nodes and a given resource pool from low to high;

condition 7, transmission mode information of a relay node satisfies at least one of following requirements:
first requirement, being comprised in a given transmission mode; and
second requirement, being excluded from a given transmission mode;

condition 8, release version information of a relay node satisfies at least one of following requirements:
first requirement, being comprised in a given release version; and
second requirement, being excluded from a given release version;

condition 9, channel measurement information measured by a relay node with a specific device satisfies at least one of following requirements:
first requirement, the channel measurement information being not worse than one or more preset thresholds; and
second requirement, part or all of the channel measurement information being one of top N9 in an order of part or all of channel measurement information of all relay nodes from good to poor;

condition 10, channel measurement information measured by a relay node with a target node satisfies at least one of following requirements:
first requirement, the channel measurement information being not worse than one or more preset thresholds; and
second requirement, part or all of the channel measurement information being one of top N10 in an order of part or all of channel measurement information of all relay nodes from good to poor;

condition 11, channel measurement information measured by the specific device with the relay node satisfies at least one of the following requirements:
first requirement, the channel measurement information being not worse than one or more preset thresholds; and
second requirement, part or all of the channel measurement information being one of top N11 in an order of part or all of channel measurement information of all relay nodes from good to poor;

wherein N1, N2, N3, N4, N5, N6, N7, N8, N9, N10 and N11 are all integers.

5. The method according to claim 4, wherein transmitting, by the remote terminal, the relay request message to the at least one relay node comprises:
directly transmitting, by the remote terminal, the relay request message to the at least one relay node; or
transmitting, by the remote terminal, the relay request message to the at least one relay node via a network-side device or a third-party device.

6. A first device for selecting a relay node, comprising a processor, a memory, and a transceiver,
wherein the processor is configured for reading a program in the memory and executing:
receiving a report message transmitted by at least one relay node via the transceiver, wherein the report message comprises relay condition information, wherein the relay condition information comprises at least one of the following information: information associated with path planning of a relay node, information associated with a vector speed of a relay node, information associated with a service which a relay node contributes, information associated with a service indicator which a relay node contributes, information associated with a service supported by a relay node, information associated with a service indicator supported by a relay node, information associated with transmission power of a relay node, information associated with a sending resource pool used by a relay node, information associated with a transmission mode of a relay node, information associated with a release version of a relay node, and information associated with channel measurement between a relay node and a specific device; and selecting a target relay node from the at least one relay node, to enable a remote terminal to establish a connection with a target node via the target relay node;

wherein the processor is further configured for reading the program in the memory and executing:

selecting, by the first device, at least two target conditions from a plurality of preset relay conditions, according to the relay condition information transmitted by the at least one relay node and/or channel measurement information detected by a specific device for each of the at least one relay node, wherein the specific device is at least one of following devices: the first device, the remote terminal, the target node, other terminals with measurement capability, and a network-side device;

determining, by the first device, one or more relay nodes that satisfy at least one target condition of the at least two target conditions, from the at least one relay node; and selecting, by the first device, the target relay node from the one or more relay nodes that satisfy the at least one target condition of the at least two target conditions, according to a weight value corresponding to each of the at least two target conditions;

wherein the plurality of preset relay conditions comprise:

condition 1, consistency between path planning information of a target relay node and a preset path satisfies at least one of following requirements:
first requirement, the consistency being not less than one or more preset thresholds; and
second requirement, the consistency being one of top N1 in an order of consistency between path planning information of all relay nodes and the preset path from high to low, wherein the preset path is a preset path range, or a path associated with a remote terminal, or a path associated with a target node, or a path associated with a path type;

condition 2, consistency between vector speed information of a target relay node and a preset vector speed satisfies at least one of following requirements:
first requirement, the consistency being not less than one or more preset thresholds; and
second requirement, the consistency being one of top N2 in an order of consistency between vector speed information of all relay nodes and the preset vector speed from high to low, wherein the preset vector speed is a preset vector speed range, or a vector speed associated with a remote terminal, or a vector speed associated with a target node;

condition 3, a service which a target relay node contributes satisfies at least one of following requirements:
first requirement, comprising a number of services in a given service set that is less than a first preset threshold;
second requirement, comprising a number of services in a given service set that is one of top N3 in an order of a number of services comprised by all relay nodes in a given service set from low to high; and third requirement, one or more service indicators therein being one of top N4 in an order of one or more service indicators of all relay nodes from poor to good;

condition 4, a service supported by a target relay node satisfies at least one of following requirements:
first requirement, comprising a number of services in a given service set that is greater than a second preset threshold;
second requirement, comprising a number of services in a given service set that is one of top N5 in an order of a number of services comprised by all relay nodes in a given service set from high to low; and
third requirement, one or more service indicators therein being one of top N6 in an order of one or more service indicators of all relay nodes from good to poor;

condition 5, transmission power of a target relay node satisfies at least one of following requirements:
first requirement, the transmission power being not less than one or more preset thresholds; and
second requirement, the transmission power being one of top N7 in an order of transmission power of all relay nodes from high to low;

condition 6, a sending resource pool of a target relay node satisfies at least one of following requirements:
first requirement, being comprised in a given resource pool;
second requirement, being excluded from a given resource pool;
third requirement, overlapped resources with a given resource pool not exceeding a preset range; and
fourth requirement, a number of overlapped resources with a given resource pool being one of top N8 in an order of a number of overlapped resources of sending resource pools of all relay nodes and a given resource pool from low to high;

condition 7, transmission mode information of a relay node satisfies at least one of following requirements:
first requirement, being comprised in a given transmission mode; and
second requirement, being excluded from a given transmission mode;

condition 8, release version information of a relay node satisfies at least one of following requirements:
first requirement, being comprised in a given release version; and
second requirement, being excluded from a given release version;

condition 9, channel measurement information measured by a relay node with a specific device satisfies at least one of following requirements:
first requirement, the channel measurement information being not worse than one or more preset thresholds; and
second requirement, part or all of the channel measurement information being one of top N9 in an order of part or all of channel measurement information of all relay nodes from good to poor;

condition 10, channel measurement information measured by a relay node with a target node satisfies at least one of following requirements:
first requirement, the channel measurement information being not worse than one or more preset thresholds; and second requirement, part or all of the channel measurement information being one of top N10 in an order of part or all of channel measurement information of all relay nodes from good to poor;
condition 11, channel measurement information measured by the specific device with the relay node satisfies at least one of following requirements:
first requirement, the channel measurement information being not worse than one or more preset thresholds; and
second requirement, part or all of the channel measurement information being one of top N11 in an order of part or all of channel measurement information of all relay nodes from good to poor;
wherein N1, N2, N3, N4, N5, N6, N7, N8, N9, N10 and N11 are all integers.

7. The first device according to claim 6, wherein when the first device is a network-side device or a third-party device, the processor is further configured for:
before the selecting the target relay node from the at least one relay node, receiving a relay request message transmitted by the remote terminal, wherein the relay request message comprises a preset relay condition required to be satisfied by the target relay node;
wherein the preset relay condition comprises at least one of following conditions:
condition 1, consistency between path planning information of a target relay node and a preset path satisfies at least one of following requirements:
first requirement, the consistency being not less than one or more preset thresholds; and
second requirement, the consistency being one of top N1 in an order of consistency between path planning information of all relay nodes and the preset path from high to low, wherein the preset path is a preset path range, or a path associated with a remote terminal, or a path associated with a target node, or a path associated with a path type;
condition 2, consistency between vector speed information of a target relay node and a preset vector speed satisfies at least one of following requirements:
first requirement, the consistency being not less than one or more preset thresholds; and
second requirement, the consistency being one of top N2 in an order of consistency between vector speed information of all relay nodes and the preset vector speed from high to low, wherein the preset vector speed is a preset vector speed range, or a vector speed associated with a remote terminal, or a vector speed associated with a target node;
condition 3, a service which a target relay node contributes satisfies at least one of following requirements:
first requirement, comprising a number of services in a given service set that is less than a first preset threshold;
second requirement, comprising a number of services in a given service set that is one of top N3 in an order of a number of services comprised by all relay nodes in a given service set from low to high; and
third requirement, one or more service indicators therein being one of top N4 in an order of one or more service indicators of all relay nodes from poor to good;
condition 4, a service supported by a target relay node satisfies at least one of following requirements:
first requirement, comprising a number of services in a given service set that is greater than a second preset threshold;
second requirement, comprising a number of services in a given service set that is one of top N5 in an order of a number of services comprised by all relay nodes in a given service set from high to low; and
third requirement, one or more service indicators therein being one of top N6 in an order of one or more service indicators of all relay nodes from good to poor;
condition 5, transmission power of a target relay node satisfies at least one of following requirements:
first requirement, the transmission power being not less than one or more preset thresholds; and
second requirement, the transmission power being one of top N7 in an order of transmission power of all relay nodes from high to low;
condition 6, a sending resource pool of a target relay node satisfies at least one of following requirements:
first requirement, being comprised in a given resource pool;
second requirement, being excluded from a given resource pool;
third requirement, overlapped resources with a given resource pool not exceeding a preset range; and
fourth requirement, a number of overlapped resources with a given resource pool being one of top N8 in an order of a number of overlapped resources of sending resource pools of all relay nodes and a given resource pool from low to high;
condition 7, transmission mode information of a relay node satisfies at least one of following requirements:
first requirement, being comprised in a given transmission mode; and
second requirement, being excluded from a given transmission mode;
condition 8, release version information of a relay node satisfies at least one of following requirements:
first requirement, being comprised in a given release version; and
second requirement, being excluded from a given release version;
condition 9, channel measurement information measured by a relay node with a specific device satisfies at least one of following requirements:
first requirement, the channel measurement information being not worse than one or more preset thresholds; and
second requirement, part or all of the channel measurement information being one of top N9 in an order of part or all of channel measurement information of all relay nodes from good to poor;
condition 10, channel measurement information measured by a relay node with a target node satisfies at least one of following requirements:
first requirement, the channel measurement information being not worse than one or more preset thresholds; and
second requirement, part or all of the channel measurement information being one of top N10 in an order of part or all of channel measurement information of all relay nodes from good to poor;

condition 11, channel measurement information measured by the specific device with the relay node satisfies at least one of following requirements:
first requirement, the channel measurement information being not worse than one or more preset thresholds; and
second requirement, part or all of the channel measurement information being one of top N11 in an order of part or all of channel measurement information of all relay nodes from good to poor;
wherein N1, N2, N3, N4, N5, N6, N7, N8, N9, N10 and N11 are all integers.

8. The first device according to claim 6, wherein when the first device is the remote terminal, the processor is further configured for:
receiving the relay condition information directly transmitted by the at least one relay node; or
receiving the relay condition information transmitted by the at least one relay node via a network-side device or a third-party device.

9. The first device according to claim 6, wherein when the first device is the remote terminal, the processor is further configured for:
before the receiving the relay condition information transmitted by the at least one relay node, transmitting a relay request message to the at least one relay node, wherein, the relay request message is configured for causing the at least one relay node to return the relay condition information to the remote terminal after receiving the relay request message, and/or, the relay request message is configured for indicating the relay condition information that the relay node requires to report;
or, before receiving the relay condition information transmitted by at least one relay node, transmitting a relay request message to the at least one relay node, wherein the relay request message comprises a preset relay condition required to be satisfied by a target relay node, so that the relay node that receives the relay request message reports whether to satisfy the preset relay condition, or the relay node satisfying the preset relay condition reports the relay condition information;
wherein the preset relay condition comprises at least one of the following conditions:
condition 1, consistency between path planning information of a target relay node and a preset path satisfies at least one of following requirements:
first requirement, the consistency being not less than one or more preset thresholds; and
second requirement, the consistency being one of top N1 in an order of consistency between path planning information of all relay nodes and the preset path from high to low, wherein the preset path is a preset path range, or a path associated with a remote terminal, or a path associated with a target node, or a path associated with a path type;
condition 2, consistency between vector speed information of a target relay node and a preset vector speed satisfies at least one of following requirements:
first requirement, the consistency being not less than one or more preset thresholds; and
second requirement, the consistency being one of top N2 in an order of consistency between vector speed information of all relay nodes and the preset vector speed from high to low, wherein the preset vector speed is a preset vector speed range, or a vector speed associated with a remote terminal, or a vector speed associated with a target node;
condition 3, a service which a target relay node contributes satisfies at least one of following requirements:
first requirement, comprising a number of services in a given service set that is less than a first preset threshold;
second requirement, comprising a number of services in a given service set that is one of top N3 in an order of a number of services comprised by all relay nodes in a given service set from low to high; and
third requirement, one or more service indicators therein being one of top N4 in an order of one or more service indicators of all relay nodes from poor to good;
condition 4, a service supported by a target relay node satisfies at least one of following requirements:
first requirement, comprising a number of services in a given service set that is greater than a second preset threshold;
second requirement, comprising a number of services in a given service set that is one of top N5 in an order of a number of services comprised by all relay nodes in a given service set from high to low; and
third requirement, one or more service indicators therein being one of top N6 in an order of one or more service indicators of all relay nodes from good to poor;
condition 5, transmission power of a target relay node satisfies at least one of following requirements:
first requirement, the transmission power being not less than one or more preset thresholds; and
second requirement, the transmission power being one of top N7 in an order of transmission power of all relay nodes from high to low;
condition 6, a sending resource pool of a target relay node satisfies at least one of following requirements:
first requirement, being comprised in a given resource pool;
second requirement, being excluded from a given resource pool;
third requirement, overlapped resources with a given resource pool not exceeding a preset range; and
fourth requirement, a number of overlapped resources with a given resource pool being one of top N8 in an order of a number of overlapped resources of sending resource pools of all relay nodes and a given resource pool from low to high;
condition 7, transmission mode information of a relay node satisfies at least one of following requirements:
first requirement, being comprised in a given transmission mode; and
second requirement, being excluded from a given transmission mode;
condition 8, release version information of a relay node satisfies at least one of following requirements:
first requirement, being comprised in a given release version; and
second requirement, being excluded from a given release version;
condition 9, channel measurement information measured by a relay node with a specific device satisfies at least one of following requirements:

first requirement, the channel measurement information being not worse than one or more preset thresholds; and second requirement, part or all of the channel measurement information being one of top N9 in an order of part or all of channel measurement information of all relay nodes from good to poor;

condition 10, channel measurement information measured by a relay node with a target node satisfies at least one of following requirements:

first requirement, the channel measurement information being not worse than one or more preset thresholds; and second requirement, part or all of the channel measurement information being one of top N10 in an order of part or all of channel measurement information of all relay nodes from good to poor;

condition 11, channel measurement information measured by the specific device with the relay node satisfies at least one of following requirements:

first requirement, the channel measurement information being not worse than one or more preset thresholds; and second requirement, part or all of the channel measurement information being one of top N11 in an order of part or all of channel measurement information of all relay nodes from good to poor;

wherein N1, N2, N3, N4, N5, N6, N7, N8, N9, N10 and N11 are all integers.

10. The first device according to claim 9, wherein the processor is further configured for:

directly transmitting the relay request message to the at least one relay node; or transmitting the relay request message to the at least one relay node via a network-side device or a third-party device.

* * * * *